US008151357B2

(12) United States Patent
Ueda et al.

(10) Patent No.: US 8,151,357 B2
(45) Date of Patent: Apr. 3, 2012

(54) INFORMATION PROCESSING APPARATUS, INFORMATION RECORDING MEDIUM MANUFACTURING METHOD, AND COMPUTER PROGRAM

(75) Inventors: Kenjiro Ueda, Kanagawa (JP); Tateo Oishi, Saitama (JP); Katsumi Muramatsu, Tokyo (JP); Yoshikazu Takashima, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 11/354,939

(22) Filed: Feb. 16, 2006

(65) Prior Publication Data

US 2008/0022131 A1 Jan. 24, 2008

(30) Foreign Application Priority Data

Feb. 25, 2005 (JP) ................................ 2005-051629

(51) Int. Cl.
*G06F 21/00* (2006.01)

(52) U.S. Cl. .............. 726/26; 726/32; 713/193; 380/45; 380/200; 380/201

(58) Field of Classification Search .................. 380/201; 726/32, 26
See application file for complete search history.

(56) References Cited

U.S. PATENT DOCUMENTS

| | | | | |
|---|---|---|---|---|
| 5,999,622 | A * | 12/1999 | Yasukawa et al. | 705/51 |
| 6,560,339 | B1 * | 5/2003 | Iwamura | 380/201 |
| 2003/0228018 | A1 * | 12/2003 | Vince | 380/277 |
| 2003/0235402 | A1 * | 12/2003 | Seo et al. | 386/95 |
| 2005/0157874 | A1 * | 7/2005 | Bresson et al. | 380/30 |
| 2009/0010437 | A1 | 1/2009 | Takashima et al. | |
| 2009/0041237 | A1 | 2/2009 | Takashima et al. | |

FOREIGN PATENT DOCUMENTS

| | | |
|---|---|---|
| JP | 7-249264 | 9/1995 |
| JP | 2002-135243 | 5/2002 |

OTHER PUBLICATIONS

Jin et al., "Traitor Tracing for Prerecorded and Recordable Media", Oct. 25, 2004, ACM, pp. 83-90.*
Silverberg et al., "Efficient Traitor Tracing Algorithms Using List Decoding," 2001, ASIACRYPT '01 Proceedings of the 7th International Conference on the Theory and Application of Cryptology and Information Security: Advances in Cryptology, pp. 176-193.*
Safavi-Naini et al., "Sequential Traitor Tracing," May 2003, pp. 1319-1326.*
Office Action issued Dec. 21, 2010, in Japanese Patent Application No. 2005-051629.

* cited by examiner

*Primary Examiner* — Taghi Arani
*Assistant Examiner* — Thaddeus Plecha
(74) *Attorney, Agent, or Firm* — Oblon, Spivak, McClelland, Maier & Neustadt, L.L.P.

(57) ABSTRACT

An information recording medium manufacturing method includes the steps of: determining an encryption mode of each sector, which serves as an encrypt processing unit; generating encrypted data having different variations by using a plurality of cryptographic keys for a segment portion; generating encrypted data by using a single cryptographic key for a non-segment portion; and recording the encrypted data. In determining the encryption mode, a cryptographic key for each sector is specified on the basis of an auxiliary file including determination information indicating whether each sector is data of a segment portion or data of a non-segment portion and identification information for identifying a segment and a variation associated with the sector if the sector is found to be the data of a segment portion. In generating the encrypted data for the segment portion or for the non-segment portion, the encrypted data is generated by using the specified cryptographic key.

6 Claims, 27 Drawing Sheets

FIG. 5

| INDEX INDEXES, FOR EXAMPLE, TITLES, THAT CAN BE DISTINGUISHED IN APPLICATION LAYER | CONTENT MANAGEMENT UNIT NUMBER (CPS UNIT NUMBER) | UNIT CLASSIFICATION NUMBER (MOVIE SEQUENCE NUMBER) | ENCRYPTED CPS UNIT KEY |
|---|---|---|---|
| TITLE 1 | CPS1 | 14 | [Ku1] |
| TITLE 2 | CPS1 | 14 | [Ku1] |
| APPLICATION 1 | CPS2 | 35 | [Ku2] |
| APPLICATION 2 | CPS3 | 22 | [Ku3] |
| : | : | : | : |
| DATA GROUP 1 | CPS4 | 138 | [Ku4] |
| DATA GROUP 2 | CPS5 | 3 | [Ku5] |
| : | : | : | : |

FIG. 6

```
                                                              Number of Bytes
     Unit Key File{
          Number of Indexes (Number of Titles)(n_t);                  2
321       for (i = 0; i < n_t; i++){
                CPS Unit Number for Index (Title)#i;                  2
          }

          Number of CPS Units(n_cu);                                  2
          for (i = 0; i < n_cu; i++){
322             Unit Classification Number for CPS Unit#i;            1
                reserved;                                            15
                Encrypted CPS Unit Key for CPS Unit#i;               16
          }
     }
```

FIG. 7

| UNIT VERSION (UNIT CLASSIFICATION NUMBER: i) | SEGMENT 0 | SEGMENT 1 | SEGMENT 2 | ... | SEGMENT 14 |
|---|---|---|---|---|---|
| V(0,i) | Enc(Ke'(0,i),Ks'(0,3)) | Enc(Ke'(0,i),Ks'(1,2)) | Enc(Ke'(0,i),Ks'(2,4)) | ... | Enc(Ke'(0,i),Ks'(14,14)) |
| V(1,i) | Enc(Ke'(1,i),Ks'(0,7)) | Enc(Ke'(1,i),Ks'(1,7)) | Enc(Ke'(1,i),Ks'(2,1)) | ... | Enc(Ke'(1,i),Ks'(14,1)) |
| V(2,i) | Enc(Ke'(2,i),Ks'(0,6)) | Enc(Ke'(2,i),Ks'(1,3)) | Enc(Ke'(2,i),Ks'(2,12)) | ... | Enc(Ke'(2,i),Ks'(14,6)) |
| V(3,i) | Enc(Ke'(3,i),Ks'(0,3)) | Enc(Ke'(3,i),Ks'(1,8)) | Enc(Ke'(3,i),Ks'(2,0)) | ... | Enc(Ke'(3,i),Ks'(14,12)) |
| : | : | : | : | : | : |
| V(j,i) | Enc(Ke'(j,i),Ks'(0,0)) | Enc(Ke'(j,i),Ks'(1,9)) | Enc(Ke'(j,i),Ks'(2,13)) | ... | Enc(Ke'(j,i),Ks'(14,11)) |
| : | : | : | : | ... | : |
| V(255,i) | Enc(Ke'(255,i),Ks'(0,15)) | Enc(Ke'(255,i),Ks'(1,3)) | Enc(Ke'(255,i),Ks'(2,7)) | ... | Enc(Ke'(255,i),Ks'(14,8)) |

V (PATH NUMBER, UNIT CLASSIFICATION NUMBER)

Ke'(PATH NUMBER, UNIT CLASSIFICATION NUMBER)
Ks'(SEGMENT NUMBER, VARIATION NUMBER)

FIG. 8A

```
                                                        Number of Bytes
Segment Key File{
    for (i = 0; i < n_cu; i++){                              2 ~331
        CPS Unit Number Using Sequence Key
            for (j = 0; j < 256; j++){
                for (k = 0; k < 15; k++){                    2  \
                    PlayList id(j, k);                       2   |
                    PlayItem id(j, k);                       2   } 332
                    Enc (Ke', Segment Key(j, k);            16  /
                }
            }
    }
}
```

FIG. 8B

- * $n_{cu}$': NUMBER OF CPS UNITS USING SEQUENCE KEY (SEGMENT KEY STRING)
- * PlayList id: ID FOR UNIQUELY IDENTIFYING PLAYLIST ON THE SAME DISC
- * PlayItem id: ID FOR UNIQUELY IDENTIFYING PLAY ITEM IN THE SAME PLAYLIST

FIG. 9

| UNIT VERSION (UNIT CLASSIFICATION NUMBER: i) | SEGMENT 0 | SEGMENT 1 | : |
|---|---|---|---|
| V(0,1) | PLAYLIST ID (0, 3)<br>PLAY ITEM ID (0, 3)<br>Enc(Ke' (0,i),Ks'(0,3)) | PLAYLIST ID (1, 2)<br>PLAY ITEM ID (1, 2)<br>Enc(Ke' (0,i),Ks'(1,2)) | : |
| : | : | : | : |

FIG. 10

| UNIT CLASSIFICATION NUMBER | UNIT VERSION | UNIT CLASSIFICATION KEY |
|---|---|---|
| 0 | V(35,0) | Kc(35,0) |
| 1 | V(241,1) | Kc(241,1) |
| 2 | V(74,2) | Kc(74,2) |
| 3 | V(35,3) | Kc(35,3) |
| : | : | : |
| i | V(1,i) | Kc(1,i) |
| : | : | : |
| 254 | V(95,254) | Kc(95,254) |

V (PATH NUMBER, UNIT CLASSIFICATION NUMBER)

Kc (PATH NUMBER, UNIT CLASSIFICATION NUMBER)

FIG. 11A

```
                                                        Number of Bytes
MovieObject(){
    [flag/mask/reserved]                                       2
    number_of_navigation_commands                              2
    IF(reg == 0)          PlayPL(PlayList id = 0);            12
    IF(reg == 1)          PlayPL(PlayList id = 1);            12
                              ...
    IF(reg == 255)        PlayPL(PlayList id = 255);          12
}
```

FIG. 11B

* reg: UNIT VERSION STORED IN REGISTER OF PLAYBACK APPARATUS. UNIT NUMBER TO BE PLAYED BACK IS CALCULATED BY UNIT CLASSIFICATION KEY STORED IN PLAYBACK APPARATUS AND UNIT CLASSIFICATION NUMBER ASSIGNED TO CPS UNIT.
* MOVIE OBJECT IDENTIFIES PLAYBACK PATH TO BE PLAYED BACK FOR CPS UNIT BY EACH PLAYBACK APPARATUS

FIG. 18

```
                                                              Number of Bytes
433  Unit Key File{
       Number of Indexes (Number of Titles)(n_t);                     2
       for (i = 0; i < n_t; i++){
           CPS Unit Number for Index (Title)#i;                       2
       }

434    Number of CPS Units(n_cu);                                     2
       for (i = 0; i < n_cu; i++){
           Unit Classification Number for CPS Unit#i;                 1
           reserved;                                                 15
           all 0s;                                                   16
       }   435
     }
```

FIG. 19A

```
                                                         Number of Bytes
Segment Key File{                                                  436
    for (i = 0; i < n_cu; i++){
        CPS Unit Number Using Sequence Key                   2
        for (j = 0; j < 256; j++){
            for (k = 0; k < 15; k++){                          ┐
                    PlayList id(j, k);                       2 │
                    PlayItem id(j, k);                       2 ├ 437
                    all 0s;                                 16 │
            }       438                                        ┘
        }
    }
}
```

FIG. 19B

* $n_{cu}$': NUMBER OF CPS UNITS USING SEQUENCE KEY (SEGMENT KEY STRING)
* PlayList id: ID FOR UNIQUELY IDENTIFYING PLAYLIST ON THE SAME DISC
* PlayItem id: ID FOR UNIQUELY IDENTIFYING PLAY ITEM IN THE SAME PLAYLIST

FIG. 21

| Syntax | Number of Bits | value |
|---|---|---|
| Li_MSTBL.DAT( ){ | | |
| UD_START_Location | 32 | |
| UD_END_Location | 32 | |
| CHT_Location | 32 | |
| CHT_Offset | 32 | |
| Content_Cert_Location | 32 | |
| Content_Cert_Offset | 32 | |
| CRL_Location | 32 | |
| CRL_Reserved_Length | 32 | |
| UK_Inf_Location | 32 | |
| UK_Inf_Offset | 32 | |
| Num_of_UK | 32 | |
| SKF_Location | 32 | |
| Num_of_SK_CPS_Unit | 32 | |
| MKB_Location | 32 | |
| MKB_Reserved_Length | 32 | |
| For (i = 0; i <N, i++ ) { | | |
| Encryption_Flag(i) | 8 | $00_{16}$ : not to-be-encrypted<br>$01_{16}$ : to-be-encrypted |
| Data_Type(i) | 8 | $01_{16}$ : 1st sector of AU<br>$02_{16}$ : 2nd sector of AU<br>$03_{16}$ : 3rd sector of AU |
| CPS_Unit_No(i) | 16 | $0000_{16}$-$FFFF_{16}$ |
| Segment_No(i) | 16 | $0000_{16}$-$000E_{16}$<br>$FFFF_{16}$: Sequence Key is not used |
| Variation_No(i) | 16 | $0000_{16}$-$000F_{16}$<br>$FFFF_{16}$: Sequence Key is not used |
| Clip_AV_File_No(i) | 24 | 00000-99999 |
| Reserved | 6 | $000000_2$ |
| Last_Sector_of_Clip(i) | 1 | $0_2$ : not Last Sector of each Clip<br>$1_2$ : Last Sector of each Clip |
| Last_Sector_of_Layer(i) | 1 | $0_2$ : not Last Sector of each Clip in layer i<br>$1_2$ : Last Sector of each Clip in each layer i |
| } | | |
| } | | |

501 (UD_START_Location through MKB_Reserved_Length)

502 (values of Encryption_Flag(i) through Last_Sector_of_Layer(i))

FIG. 22

UD_START_Location: Physical Sector Number of Start Point of User Data (Data Zone) of Each Layer
UD_END_Location: Physical Sector Number of End Point of User Data (Data Zone) of Each Layer
CHT_Location: Physical Sector Number of Start Point of CHT
CHT_Offset: Number of Bytes from Start Point of CHT to Immediately before Hash Value (Data Embedded by Mastering Facility)
Content_Cert_Location: Physical Sector Number of Start Point of Content Certificate
Content_Cert_Offset: Number of Bytes from Start Point of Content Certificate to Immediately before Content ID (Data Embedded by Mastering Facility)
CRL_Location: Physical Sector Number of Start Point of Content Revocation List
CRL_Reserved_Length: Number of Bytes of the CRL Embedding Area Reserved by Authoring Facility
UK_Inf_Location: Physical Sector Number of Start Point of Unit_Key.inf (if Unit_Key.inf is not Recorded in Corresponding Layer, Indicate 0000000016)
UK_Inf_Offset: Number of Bytes from Start Point of Unit_Key.inf to Immediately before Encrypted Unit Key for CPS Unit#1 (if Unit_Key.inf is not Recorded in Corresponding Layer, Indicate 0000000016)
Num_of_UK: Number of Unit Keys in the Overall Disc (=Number of CPS Units)
SKF_Location: Physical Sector Number of Start Point of Segment Key File (if Unit_Key.inf is not Recorded in Corresponding Layer, Indicate 0000000016)
Num_of_SK_CPS_Unit: Number of CPS Units of the Overall Disc to which Sequence Key is Applied
MKB_Location: Physical Sector Number of Start Point of MKB (if MKB_Cert is not Recorded in Corresponding Layer, Indicate 0000000016)
MKB_Reserved_Length: Number of Bytes of the MKB Embedding Area Reserved by Authoring Facility
N: Number of Logical Sectors of Layer i
Encryption_Flag: Flag Indicating whether Encryption is Executed
Data_Type: Flag Indicating Sector Type
CPS_Unit_No: CPS Unit Number/Segment_No : Segment Number/Variation_No : Variation Number
Clip_AV_File_No: Clip AV File Number (Information Used for Creating CHT)
Last_Sector_of_Clip: Flag Indicating Last Sector of Each Clip (Regardless of Layer)
Last_Sector_of_Layer: Flag Indicating Last Sector of Each Clip in Each Layer

FIG. 24A

```
SKTBL.DAT( ){                                               Number of Bits
    Num_of_CPS_Unit_applied_SK(n_cu');                          16
    For (i = 0; i < n_cu', i++ ) {
    CPS_Unit_Number_applied_SK(i);                              16
          For (j = 0; j < 256, j++ ) {
                For (k = 0; k < 15, j++ ) {
                      Variation_Number for (j, K);              8
                }
          }
    }
}
```

FIG. 24B

Num_of_CPS_Unit_applied_SK: NUMBER OF CPS UNITS USING SEQUENCE KEY
CPS_Unit_Number_applied_SK: CPS UNIT NUMBER USING SEQUENCE KEY
Variation_Number: NUMBER INDICATING VARIATION NUMBER OF SEGMENT

INFORMATION PROCESSING APPARATUS, INFORMATION RECORDING MEDIUM MANUFACTURING METHOD, AND COMPUTER PROGRAM

CROSS REFERENCES TO RELATED APPLICATIONS

The present invention contains subject matter related to Japanese Patent Application JP 2005-051629 filed in the Japanese Patent Office on Feb. 25, 2005, the entire contents of which are incorporated herein by reference.

BACKGROUND OF THE INVENTION

1. Field of the Invention

The present invention relates to information processing apparatuses, information recording media manufacturing methods, and computer programs. More particularly, the invention relates to an information processing apparatus, an information recording medium manufacturing method, and a computer program that enable efficient processing when manufacturing an information recording medium in which encrypted content having a special data structure that eliminates the unauthorized use of content and implements strict content usage management is stored.

2. Description of the Related Art

Various software data (hereinafter referred to as "content"), such as audio data, e.g., music, image data, e.g., movies, game programs, and various application programs, can be stored on recording media, for example, Blu-ray Discs™ using blue laser light, digital versatile discs (DVDs), mini discs (MDs), compact discs (CDs), as digital data. In particular, Blu-ray discs using blue laser light are high-density recording discs and can record a large volume of video content as high-quality image data.

Digital content is stored in various information recording media, such as those described above, and is provided to users. A user uses the digital content by playing it back on the user's personal computer (PC) or a player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", and the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data, such as, video data or sound data, encrypted and recorded on, for example, a DVD read only memory (DVD-ROM), can be descrambled for playing back the content.

In descramble processing, it is necessary to execute processing using specific data, such as a key, provided for licensed DVD players. A license is given to DVD players that are designed in compliance with predetermined operation rules, for example, agreeing not to perform unauthorized copying. Accordingly, licensed DVD players can descramble data recorded on a DVD-ROM by using specific data, for example, a given key, to play back images or sound from the DVD-ROM.

On the other hand, an unlicensed DVD player cannot play back data recorded on the DVD-ROM since it does not have a key for descrambling the scrambled data. In this manner, in the content scrambling system, DVD players that do not satisfy conditions demanded for receiving a license cannot play back digital data from the DVD-ROM, thereby preventing unauthorized copying.

However, such a content scrambling system is not a perfect system, and there are many content scrambling systems whose descrambling methods have already been deciphered and are distributed via communication means, such as the Internet. In this manner, once scrambling methods are deciphered, content is illegally played back or copied by unauthorized descramble processing, and the copyright or the right to use content is violated. Assuming that there is no perfect system, key revoking techniques are available as the countermeasures against deciphering scrambling methods. In those techniques, to revoke keys, it is necessary to identify in which devices hacking has occurred, and a method for tracing such devices is known as "traitor tracing", as disclosed in WO01/45410 and the published Japanese translations of PCT international publication for patent application No. 2004-532495.

SUMMARY OF THE INVENTION

However, in the method disclosed in WO01/45410, one screen is divided into a plurality of segments, which makes the management of keys complicated and also makes it difficult to speedily perform a playback operation. The published Japanese translations of PCT international publication for patent application No. 2004-532495 does not disclose a specific configuration, nor does it disclose how a playback order is determined. Additionally, there is no description of authoring performed by a content author as intended when manufacturing a recording medium.

It is thus desirable to provide an information processing apparatus, an information recording medium manufacturing method, and a computer program that enable efficient processing when manufacturing an information recording medium in which encrypted content having a special data structure that eliminates the unauthorized use of content and implements strict content usage management is stored.

More particularly, it is desirable to provide an information processing apparatus, an information recording medium manufacturing method, and a computer program in which recording data can be efficiently generated by using auxiliary files when manufacturing an information recording medium storing encrypted content having a special data structure in which a segment, which serves as a content recording unit of the information recording medium, is formed of a plurality of variations using different cryptographic keys, and only a specific playback sequence, which is set by selecting specific variations, can be decrypted when performing playback processing by the information processing apparatus.

According to an embodiment of the present invention, there is provided an information recording medium manufacturing method including the steps of: determining an encryption mode of each sector, which serves as an encrypt processing unit for content to be recorded on an information recording medium; generating encrypted data having different variations by using a plurality of cryptographic keys for a segment portion forming the content; generating encrypted data by using a single cryptographic key for a non-segment portion, which is different from the segment portion; and recording the encrypted data generated for the segment portion and the encrypted data generated for the non-segment portion on the information recording medium. In determining the encryption mode, a cryptographic key for each sector is specified on the basis of an auxiliary file including determination information indicating whether each sector is data of a segment portion or data of a non-segment portion and identification information for identifying a segment and a variation associated with the sector if the sector is found to be the data of a segment portion. In generating the encrypted data for the segment portion or the encrypted data for the non-segment portion, the encrypted data is generated by using the specified cryptographic key.

The encryption mode determining step may include the steps of: reading sector data to be encrypted; determining whether encryption is necessary based on an encryption flag of the sector to be encrypted read from the auxiliary file; determining, if it is determined that encryption is necessary, whether the sector to be encrypted is data of a segment portion or data of a non-segment portion by referring to the auxiliary file; and obtaining, if it is determined that the sector to be encrypted is data of a segment portion, a segment number and a variation number associated with the sector to be encrypted from the auxiliary file, and selecting a segment key, which is used as a cryptographic key, corresponding to the variation on the basis of the obtained segment number and variation number. In generating the encrypted data for the segment portion, the encrypted data having different variations may be generated by encrypting the segment portion forming the content by using the selected segment key.

In determining the encryption mode, if the sector to be encrypted is found to be data of a non-segment portion, a unit key, which is used as a cryptographic key, may be selected based on a unit identifier recorded in the auxiliary file, and in generating the encrypted data for the non-segment portion, the encrypted data may be generated by using the selected unit key for the non-segment portion.

According to another embodiment of the present invention, there is provided an information recording medium manufacturing method including the steps of: sequentially obtaining, on the basis of an auxiliary file, variation numbers that are set in accordance with combinations (j, k) of path numbers (j), which serve as information for specifying key strings used for encrypting content to be recorded on an information recording medium, and segment numbers (k), which serve as identification information for segments forming the content; sequentially obtaining, on the basis of the variation numbers obtained from the auxiliary file, information for generating segment keys used for encrypting data associated with individual segments and individual variations and storing the information in a key file, thereby generating a segment key file; and recording the generated segment key file on the information recording medium.

The auxiliary file may include information indicating the number of content management units using the segment keys, and a program for sequentially providing, for each of the content management units, variation numbers that are set in accordance with combinations (j, k) of path numbers (j), which serve as information for specifying key strings used for encrypting content, and segment numbers (k), which serve as identification information for segments forming the content. In generating the segment key file, the program may be executed for each of the content management units to be recorded on the information recording medium to generate a plurality of segment key files associated with the content management units.

According to another embodiment of the present invention, there is provided an information processing apparatus including: encryption mode determining means for determining an encryption mode of each sector, which serves as an encrypt processing unit for content to be recorded on an information recording medium; segment portion encrypting means for generating encrypted data having different variations by using a plurality of cryptographic keys for a segment portion forming the content; non-segment portion encrypting means for generating encrypted data by using a single cryptographic key for a non-segment portion, which is different from the segment portion; and recording means for recording the encrypted data generated by the segment portion encrypting means and the encrypted data generated by the non-segment portion encrypting means on the information recording medium. The encryption mode determining means specifies a cryptographic key for each sector on the basis of an auxiliary file including determination information indicating whether each sector, which serves as the encrypt processing unit, is data of a segment portion or data of a non-segment portion and identification information for identifying a segment and a variation associated with the sector if the sector is found to be the data of a segment portion. Each of the segment portion encrypting means and the non-segment portion encrypting means generates the encrypted data by using the cryptographic key specified by the encryption mode determining means.

The encryption mode determining means may read an encryption flag of sector data to be encrypted from the auxiliary file to determine whether encryption is necessary, and may determine, if it is determined that encryption is necessary, whether the sector to be encrypted is data of a segment portion or data of a non-segment portion by referring to the auxiliary file, and may obtain, if it is determined that the sector to be encrypted is data of a segment portion, a segment number and a variation number associated with the sector to be encrypted from the auxiliary file and selects a segment key, which is used as a cryptographic key, corresponding to the variation on the basis of the obtained segment number and variation number. The segment portion encrypting means may generate the encrypted data having different variations by encrypting the segment portion forming the content by using the segment key selected by the encryption mode determining means.

The encryption mode determining means may select, if the sector to be encrypted is found to be data of a non-segment portion based on the auxiliary file, a unit key, which is used as a cryptographic key based on a unit identifier recorded in the auxiliary file. The non-segment portion encrypting means may generate the encrypted data by encrypting the non-segment portion by using the unit key selected by the encryption mode determining means.

According to another embodiment of the present invention, there is provided an information processing apparatus including: variation number obtaining means for sequentially obtaining, on the basis of an auxiliary file, variation numbers that are set in accordance with combinations (j, k) of path numbers (j), which serve as information for specifying key strings used for encrypting content to be recorded on an information recording medium, and segment numbers (k), which serve as identification information for segments forming the content; cryptographic key file generating means for sequentially obtaining, on the basis of the variation numbers obtained from the auxiliary file, information for generating segment keys used for encrypting data associated with individual segments and individual variations and storing the information in a key file, thereby generating a segment key file; and recording means for recording the segment key file generated by the cryptographic key file generating means on the information recording medium.

The auxiliary file may include information indicating the number of content management units using the segment keys, and a program for sequentially providing, for each of the content management units, variation numbers that are set in accordance with combinations (j, k) of path numbers (j), which serve as information for specifying key strings used for encrypting content, and segment numbers (k), which serve as identification information for segments forming the content. The cryptographic key file generating means may execute the program for each of the content management units to be recorded on the information recording medium to generate a plurality of segment key files associated with the content management units.

According to another embodiment of the present invention, there is provided a computer program allowing a computer to execute encrypt processing on content to be recorded on an information recording medium. The computer program includes the steps of: determining an encryption mode of each sector, which serves as an encrypt processing unit; generating encrypted data having different variations by using a plurality of cryptographic keys for each segment portion forming the content; and generating encrypted data by using a single cryptographic key for a non-segment portion, which is different from the segment portion. In determining the encryption mode, a cryptographic key for each sector is specified on the basis of an auxiliary file including determination information indicating whether each sector is data of a segment portion or data of a non-segment portion and identification information for identifying a segment and a variation associated with the sector if the sector is found to be the data of a segment portion.

According to another embodiment of the present invention, there is provided a computer program allowing a computer to execute processing for generating a cryptographic key file storing cryptographic information therein to be used for executing encrypt processing on content. The computer program includes the steps of: sequentially obtaining, on the basis of an auxiliary file, variation numbers that are set in accordance with combinations (j, k) of path numbers (j), which serve as information for specifying key strings used for encrypting the content to be recorded on an information recording medium, and segment numbers (k), which serve as identification information for segments forming the content; and sequentially obtaining, on the basis of the variation numbers obtained from the auxiliary file, information for generating segment keys used for encrypting data associated with individual segments and individual variations and storing the information in a key file, thereby generating a segment key file.

The computer programs according to embodiments of the present invention are computer programs that can be provided via a computer-readable storage medium, such as a CD, a floppy disk (FD), or a magneto-optical (MO) disk, or a computer-readable communication medium, such as a network, to a computer system that can execute various program codes. By providing such programs in a computer-readable format, processing can be executed on a computer system in accordance with the programs.

Other objects, features, and advantages of the present invention will become clear from a detailed description of the invention on the basis of an embodiment of the present invention, which is described below, and the accompanying drawings. In this specification, the system is a logical set of a plurality of apparatuses, and it is not necessary that the apparatuses be in the same housing.

According to an embodiment of the present invention, an information recording medium stores encrypted content having a data structure in which each segment, which serves as a content recording unit of an information recording medium, is formed of a plurality of variations using different cryptographic keys, and only a specific playback sequence, which is set by selecting specific variations, can be decrypted when performing playback processing by an information processing apparatus. When manufacturing such an information recording medium, encrypted content and key files are generated by using auxiliary files, thereby achieving the efficient generation of recording data.

Also in an embodiment of the present invention, according to an encryption auxiliary file, it can be determined whether each sector is segment data or non-segment data, and if the sector is segment data, the keys used for encrypting the sector data, i.e., the unit key and segment keys, can be immediately determined since segment numbers and variation numbers are recorded in the encryption auxiliary file, thereby enabling efficient encrypt processing.

According to an embodiment of the present invention, by using an auxiliary file for generating a key file, variation numbers can be sequentially obtained for the individual segments and the individual variations, and segment keys associated with the obtained variation numbers can be correctly obtained, and based on the obtained segment keys, encrypted segment-key generating keys [Enc(Ke'(n, i), Ks'(x, y))] can be generated, thereby efficiently generating a segment key file. The segment key file is set for each content protection system (CPS) unit, and when the CPS unit number (i) recorded in the auxiliary file is switched, the segment key file to be generated can be switched at the same time. By using the single auxiliary file, key storage processing for a plurality of segment key files associated with CPU units can be efficiently performed.

BRIEF DESCRIPTION OF THE DRAWINGS

FIG. 5 illustrates the structure of a CPS unit key file;

FIG. 6 is a syntax diagram illustrating the structure of a CPS unit key file;

FIG. 7 illustrates the structure of a segment key file;

FIGS. 8A and 8B are a syntax diagram illustrating the structure of a segment key file;

FIG. 9 illustrates the structure of a segment key file;

FIG. 10 illustrates the structure of a unit classification key file;

FIGS. 11A and 11B illustrate the structure of a movie object, which is a content playback program;

FIG. 18 illustrates the data structure of a skeleton CPS unit key file without key information;

FIGS. 19A and 19B illustrate the data structure of a skeleton segment key file without key information;

FIG. 21 illustrates an auxiliary file used for efficiently executing content encrypt processing;

FIG. 22 illustrates the contents of an auxiliary file for content encrypt processing;

FIGS. 24A and 24B illustrate an auxiliary file used for generating a segment key file;

DESCRIPTION OF THE PREFERRED EMBODIMENTS

Details of an information processing apparatus, an information recording medium, an information processing method, and a computer program according to an embodiment of the present invention are described below in the following order of sections with reference to the accompanying drawings.

Figure 1:
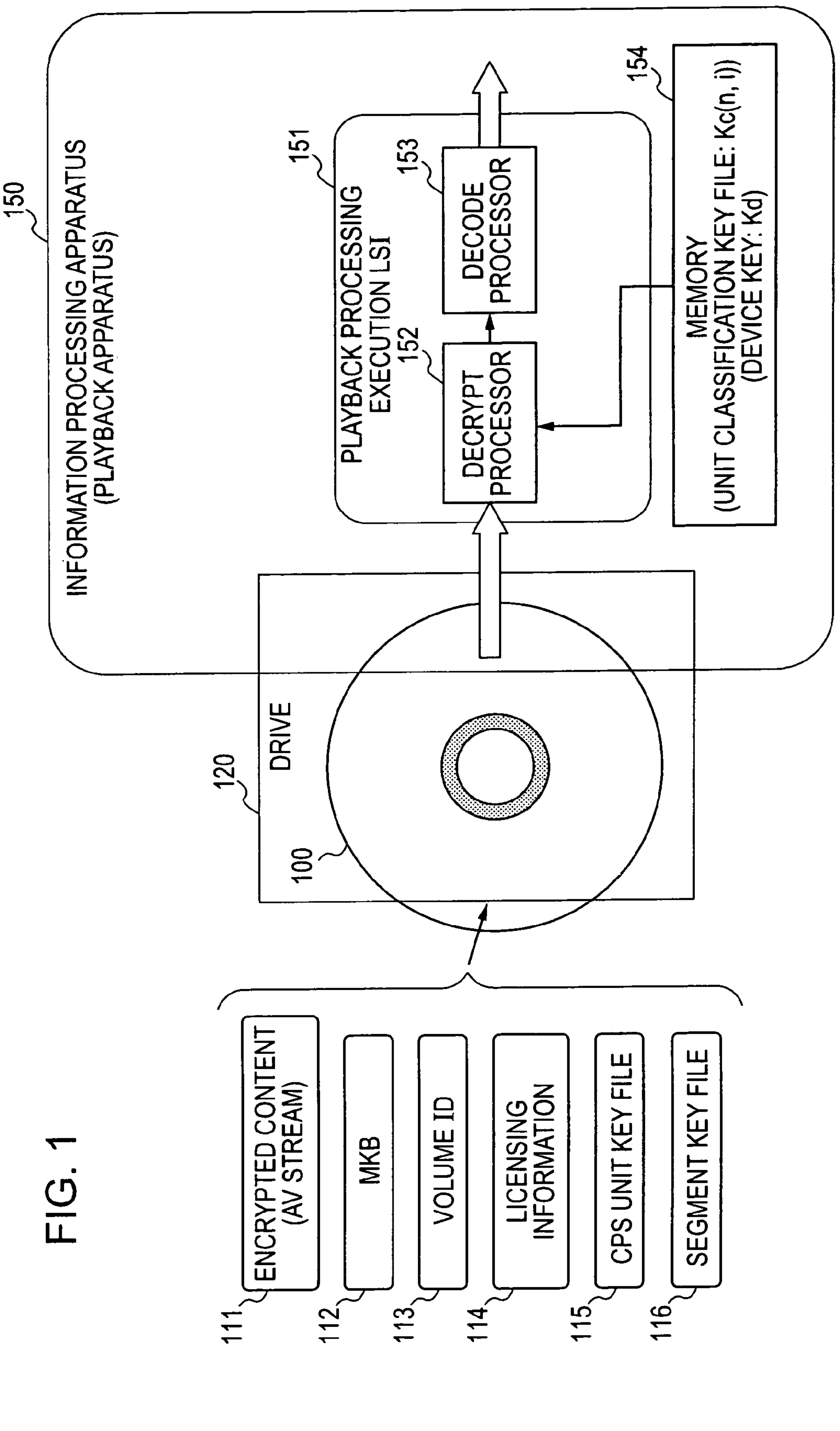
FIG. 1 illustrates the data structure stored in an information recording medium, and the configuration and processing of an information processing apparatus that performs playback processing.

1. Overview of Storage Data of Information Recording Medium and Information Processing Apparatus 2. Detailed Structure of Storage Data of Information Recording Medium and Storage Data of Information Processing Apparatus 2.1. CPS Unit 2.2. Segment 2.3. CPS Unit Key File 2.4. Segment Key File 2.5. Unit Classification Key File 2.6. Movie Object 3. Content Playback Processing in Information Processing Apparatus 4. Manufacturing Process for Information Recording Medium 5. Example of Configuration of Information Processing Apparatus 1. Overview of Storage Data of Information Recording Medium and Information Processing Apparatus An overview of storage data of an information recording medium and an information processing apparatus is first discussed. In FIG. 1, the configuration of an information processing medium 100 and an information processing apparatus (playback apparatus) 150 storing content therein is shown. In FIG. 1, information is stored in a ROM disc, which serves as a content storage disc. The information processing apparatus 150 is, for example, a PC or a playback-only device, and includes a drive 120 for reading data from the information recording medium 100.

A ROM disc as the information recording medium 100, such as a Blu-ray disc or a DVD, storing authorized content, is manufactured in a disc manufacturing factory with the permission of a so-called "content right holder" having an authorized content copyright or distribution right. In the following embodiment, as the information recording medium, a disc medium is used. In the present invention, however, various forms of information recording media can be used.

The information recording medium 100 stores, as shown in FIG. 1, encrypted content 111 subjected to encrypt processing, a media key block (MKB) 112, which serves as a cryptographic key block, generated based on a tree-structure key distribution system, which is known as one mode of a broadcast encryption system, a volume ID 113, which is set as identification information for each information recording medium or a predetermined number of information recording media, licensing information 114 including copy control information (CCI) as content copy/playback control information, a content management unit (CPS) unit key file 115 storing a CPS unit key, which is a cryptographic key set for each CPS unit, which serves as a content usage management unit, and a segment key file 116, which is a file for obtaining segment keys used as cryptographic keys for segment data generated by encrypting part of the content stored in the information recording medium 100 with the different cryptographic keys. An overview of various items of information is discussed below.

Encrypted Content 111

In the information recording medium 100, various items of content data, such as audiovisual (AV) streams of moving picture content, for example, high definition (HD) movie content, game programs, image files, sound data, and text data, defined by specific standards, are stored. Those items of content are specific AV format standard data, which are stored according to specific AV data formats. More specifically, for example, content is stored as the Blu-ray disc ROM standard data according to the Blu-ray ROM standard format. Those items of content are referred to as "main content".

Game programs, image files, sound data, or text data, which serve as service data, may be stored as "sub-content". The sub-content is data having a data format which is not compliant with a specific AV data format. That is, such data can be stored as Blu-ray disc ROM nonstandard data according to a certain format which is not compliant with the Blu-ray disc ROM standard format.

As the types of content, both the main content and the sub-content include various content, such as music data, image data, for example, moving pictures and still images, game programs, and WEB content. Such content include various modes of information, such as content information that can be used only by data from the information recording medium 100, and content information that can be used by a combination of the data from the information recording medium 100 and data provided from a server connected to the recording medium 100 via a network. To individually control the use of each segment of content, the content stored in the information recording medium 100 is stored by assigning different keys (title keys) to segments and by encrypting each segment with a key (title key), which is different from those for the other segments. The unit to which one title key is assigned is referred to as a "content management unit (CPS unit)".

MKB

The MKB 112 is a cryptographic key block generated based on a tree-structure key distribution system, which is known as one mode of the broadcast encryption method. The MKB 112 is a key information block that makes it possible to obtain a media key (Km), which is a key necessary for decrypting content, only by processing (decryption) on the basis of a device key (Kd) stored in information processing apparatuses having valid licenses. The MKB 112 is based on an information distribution system according to a so-called hierarchical tree structure. The MKB 112 makes it possible to obtain the media key (Km) only when a user device (information processing apparatus) has a valid license, and to disable revoked user devices from obtaining the media key (Km).

By changing the device key used for encrypting key information stored in the MKB 112, a management center, which serves as a license entity, allows the MKB 112 to disable a device key stored in a specific user device from decrypting content, that is, makes the user device unable to obtain the media key necessary for decrypting the content. It is thus possible to provide encrypted content only to devices having valid licenses while revoking unauthorized devices at a suitable time. Content decrypt processing is discussed below.

Volume ID

The volume ID 113 is an ID set as identification information for each information recording medium or a predetermined number of information recording media. The volume ID 113 is used as information for generating a key for decrypting content. The processing using the volume ID 113 is discussed below.

Licensing Information

Licensing information includes, for example, copy/playback control information (CCI), that is, copy restriction information or playback restriction information used for controlling the use of the encrypted content 111 stored in the information recording medium 100. The copy/playback control information (CCI) may be set in various manners, such as being set for each CPS unit, which serves as the content management unit, or for a plurality of CPS units. Details of the licensing information are given in the following section.

CPS Unit Key File

The encrypted content 111 stored in the information recording medium 100 is encrypted by a unique cryptographic key, which is used for the corresponding CPS unit set as the content management unit, as described above. AV streams, music data, image data, such as moving pictures and still images, game programs, and WEB content forming content are segmented into CPS units, which serve as content usage management units. When performing playback processing, it is necessary that an information processing apparatus determine the CPS unit to which the content to be played back belongs, and perform decrypt processing by using the CPS unit key as the cryptographic key corresponding to the determined CPS unit. The file storing data necessary for obtaining the CPS unit key is the CPS unit key file 115. Details of the CPS unit key file 115 are given below. To play back content, not only the CPS unit key, but also various other key information and key generation information, should be applied. Specific processing of such information is also discussed below.

Segment Key File

As stated above, the content stored in the information recording medium 100 is encrypted and stored on the basis of CPS units. Moreover, content belonging to one CPS unit includes segment data formed of a plurality of variations generated by encrypting part of the content with different cryptographic keys. The segment key file is a file for obtaining the segment keys used as the cryptographic keys for encrypting the segment data.

When performing playback processing, an information processing apparatus plays back content in accordance with a specific path (sequence) set by selecting specific segment data from each of the plurality of segments of the content. The file for storing data for obtaining segment keys for decrypting segment data (encrypted data) having a specific variation, which is set for each segment, is the segment key file. For playing back content, it is necessary to obtain a plurality of CPS unit keys and a plurality of segment keys based on a specific path (sequence).

That is, to play back content, it is necessary to decrypt content by switching CPS unit keys and segment keys corresponding to specific variations of segment data. A key string of segment keys based on a specific path is referred to as a "sequence key". Details of obtaining and using the segment key file and the segment keys are discussed below.

FIG. 1 illustrates the schematic configuration of the information processing apparatus 150 executing playback processing for the content stored in the information recording medium 100. The information processing apparatus 150 includes the drive 120 for reading data stored in the information recording medium 100. The data read by the drive 120 is input into a playback processing execution LSI 151 that decrypts and decodes, for example, moving picture experts group (MPEG)-decodes, encrypted content.

The playback processing execution LSI 151 includes a decrypt processor 152 for executing decrypt processing on encrypted content and a decode processor 153 for executing decode, for example, MPEG-decode, processing on the encrypted content. The decrypt processor 152 generates a key for decrypting content by using various information stored in a memory 154 and the data read from the information recording medium 100, and then executes decrypt processing on the encrypted content 111.

In the memory 154, a unit classification key file: Kc (n, i) and a device key: Kd are stored. When decrypting encrypted content of the information recording medium 100, the information processing apparatus 150 generates a key for decrypting the content on the basis of the data stored in the memory 154 and the data read from the information recording medium 100, and then executes decrypt processing on the encrypted content 111. Details of the data stored in the memory 154 and decrypt processing are discussed in the following section.

2. Detailed Structure of Storage Data of Information Recording Medium and Storage Data of Information Processing Apparatus A description is now given of the detailed structure of data stored in an information recording medium with reference to, for example, FIG. 2.

2.1. CPS Unit

As stated above, to control the use of content based on different content units, content stored in an information recording medium is encrypted and stored by assigning different keys to content units. That is, the content is segmented into content management units (CPS units), and the CPS units are individually encrypted and usage control is performed for the individual CPS units.

To use content, it is necessary to first obtain a CPS unit key assigned to each unit, and then, by using the CPS unit key and other required keys and key generation information, data processing based on a predetermined decrypt processing sequence is executed to play back content. Examples of setting content management units (CPS units) are discussed below with reference to FIG. 2.

Figure 2:
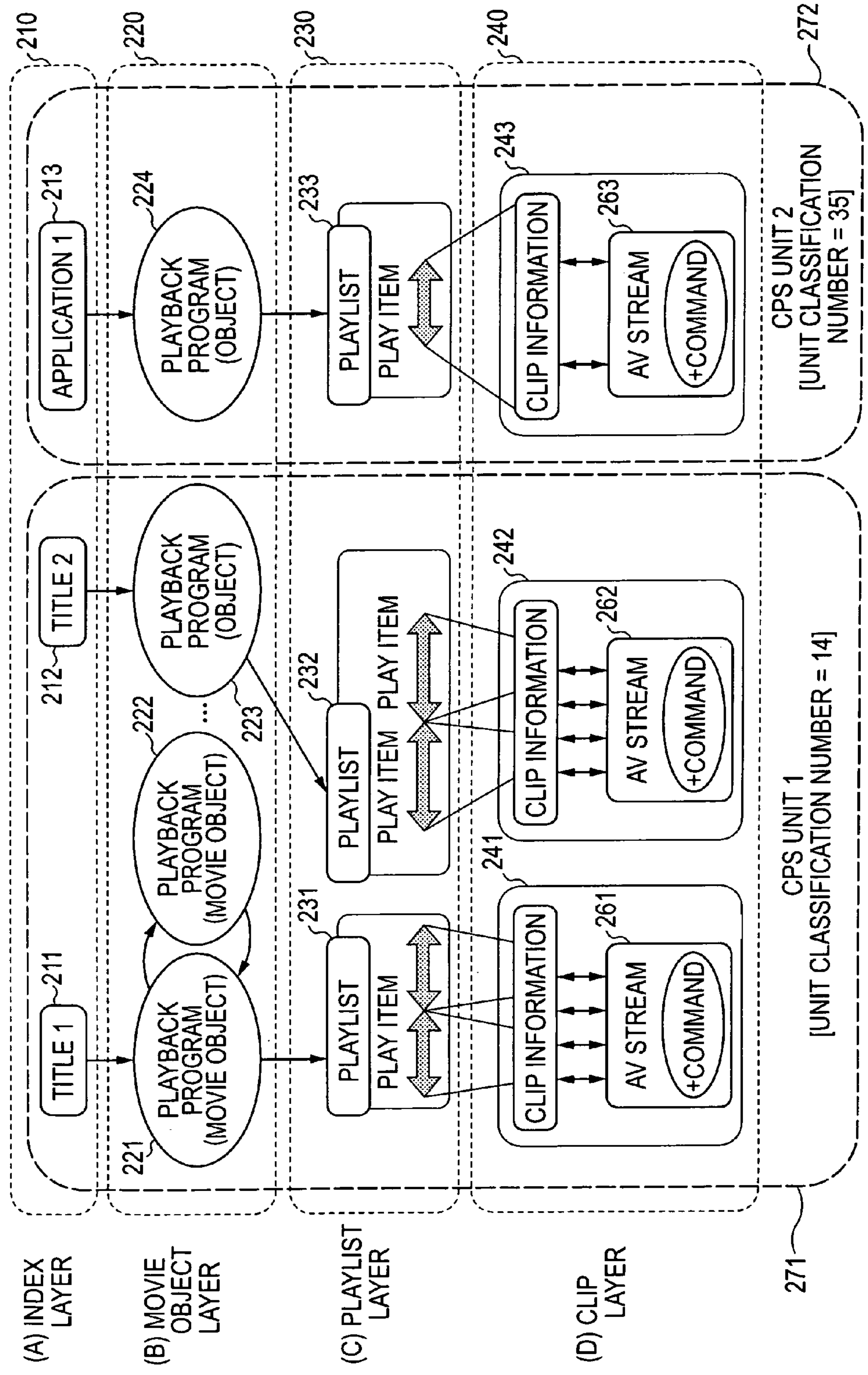
FIG. 2 illustrates examples of setting content management units for content stored in an information recording medium.

Content has, as shown in FIG. 2, a hierarchical structure including (A) an index layer 210, (B) a movie object layer 220, (C) a playlist layer 230, and (D) a clip layer 240. When designating an index, such as a title, accessed by a playback application, a playback program associated with the title is designated, and a playlist defining, for example, a content playback order, is selected according to program information concerning the designated playback program.

A playlist includes play items as information concerning data to be played back. According to clip information as a playback zone defined by the play items contained in the playlist, AV streams or commands as real content data are selectively read to play back the AV streams or to execute the commands. There are a plurality of playlists or a plurality of play items, and playlist IDs or play item IDs are associated with the playlists or play items as identification information.

FIG. 2 shows two CPS units, which form part of content stored in an information recording medium. Each of a CPS unit-1 271 and a CPS unit-2 272 includes a title as an index, a movie object as a playback program file, a playlist, and an AV stream file as real content data.

The content management unit (CPS unit)-1 271 includes a title-1 211 and a title-2 212, playback programs 221 and 222, playlists 231 and 232, and clips 241 and 242. At least AV stream data files 261 and 262, which serve as real content data, contained in the two clips 241 and 242, respectively, are data to be encrypted, and are basically encrypted with a CPS unit key (Kul), which is a cryptographic key associated with the content management unit (CPS unit)-1 271. Segments, which are data forming content, are encrypted with segment keys, and details of segments are given below. Content is divided into segment portions and non-segment portions, and the non-segment portions are encrypted with the CPS unit key, and the segment portions are formed of a plurality of variations, which include segment data encrypted with different segment keys. The configurations of the non-segment portions and segment portions are discussed in detail in the following section.

A unit classification number (movie sequence number) is set in each content management unit (CPS unit). The unit classification number is any number that can be determined by a content owner, which is a content providing entity, or an authoring facility, which is a content editing entity, and for example, 255 numbers from 0 to 254, are provided. The unit classification number is used as a parameter for determining the content playback path. The content playback path is described in detail in the following section with reference to, for example, FIG. 3. In the example shown in FIG. 2, the unit classification number 14 is set for the content management unit (CPS unit)-1 271, as indicated in the bottommost section of FIG. 1.

The content management unit (CPS unit)-2 272 includes an application-1 213 as an index, a playback program 224, a playlist 233, and a clip 243. An AV stream data file 263, which is real content data, contained in the clip 243 is encrypted with a CPS unit key (Ku2), which is a cryptographic key associated with the content management unit (CPS unit)-2 272. A unit classification number 35 is set for the content management unit (CPS unit)-2 272.

To execute an application file or content playback processing corresponding to the content management unit-1 271, the user has to obtain the unit key: Ku1, which is a cryptographic key associated with the content management unit (CPS unit)-1 271 and to perform decrypt processing with the unit key: Ku1. To execute an application file or content playback processing corresponding to the content management unit-2 272, the user has to obtain the unit key: Ku2, which is a cryptographic key associated with the content management unit (CPS unit)-2 272 and to perform decrypt processing with the unit key: Ku2.

2.2 Segment

Further, in content playback processing, it may be necessary that not only unit keys, but also segment keys (Ks) corresponding to divided segments forming data, be obtained. The configuration of segments is discussed below with reference to FIG. 3.

Figure 3:
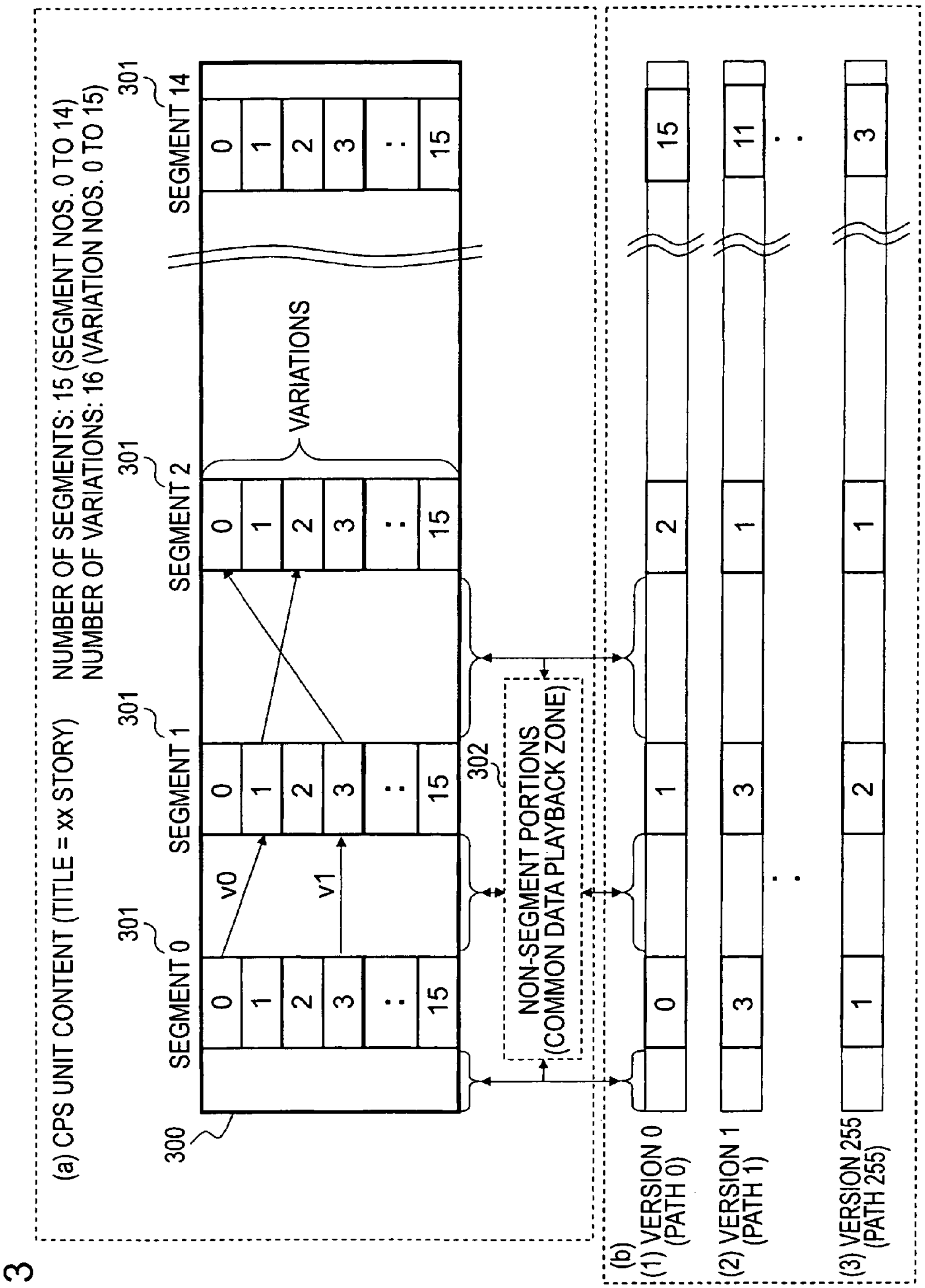
FIGS. 3 and 4 illustrate setting of segments for content.

In the upper part (a) of FIG. 3, the data structure of one piece of content belonging to a content management unit (CPS unit) stored in an information recording medium is shown. Content 300 is, for example, one piece of movie content which forms title "xx story". The content 300 includes, as indicated by (a) of FIG. 3, a plurality of segment portions 301 and a plurality of non-segment portions 302.

For easy understanding, it is now assumed that the playback data is stored along the playback time axis from the left to the right in FIG. 3. An information processing apparatus to play back the content 300 alternately plays back the non-segment portions 302 and the segment portions 301. The non-segment portions 302 are content portions that can be played back by obtaining the above-described unit key (Ku), i.e., content portions that can be played back by being decrypted with the obtained unit key (Ku), which is common for all information processing apparatuses.

On the other hand, it is necessary that the segment portions 301 be decrypted by obtaining keys different from the above-described unit key (Ku), i.e., segment keys (Ks) associated with the variations of the segments. The number of segments in one piece of content is, for example, as shown in FIG. 3, 15 from 0 to 14. Each of the plurality of segment portions 301 is formed of segment data having 16 variations from 0 to 15.

The 16 segment data contained in each segment portion 301 indicate all the same data (for example, the same playback image scene of a movie for several seconds). For example, the 16 segment data contained in segment 0 store the scene after the non-segment portion 302 located before segment 0 (at the left of segment 0 in FIG. 3).

The 16 segment data having variations 0 to 15 contained in segment 0 indicate data associated with the same scene, but are encrypted with different segment keys Ks (0, 0) through Ks (0, 15).

If the segment key is indicated by Ks(x, y), x represents the segment number and y designates the variation number. That is, the segment key Ks(x, y) is a segment key having a segment number x and a variation number y. All the segment data (15×16=240) contained in segment 0 to segment 14 shown in FIG. 3 are data encrypted with segment keys Ks(0, 0) through Ks(14, 15) associated with the corresponding segment data.

An information processing apparatus to play back content can decrypt only one segment data selected from the 16 segment data having variations 0 to 15 contained in segment 0. For example, information processing apparatus A can obtain only one segment key Ks(0, 0) from the segment keys Ks(0, 0) through Ks(0, 15), and information processing apparatus B can obtain only one segment key Ks(0, 3) from the segment keys Ks(0, 0) through Ks(0, 15).

Similarly, the 16 segment data having variations 0 to 15 contained in segment 1 indicate data generated by encrypting a common scene with different segment keys Ks(1, 0) through Ks(1, 15). Also concerning the 16 segment data having variations 0 to 15 contained in segment 1, an information processing apparatus can decrypt only one segment data selected from the 16 segment data having variations 0 to 15 contained in segment 1. For example, information processing apparatus A can obtain only one segment key Ks(1, 1) from the segment keys Ks(1, 0) through Ks(1, 15), and information processing apparatus B can obtain only one segment key Ks(1, 3) from the segment keys Ks(1, 0) through Ks(1, 15).

When performing content playback processing, each information processing apparatus obtains the version number associated with each CPS unit based on the unit classification number set for the CPS unit and the unit classification key file: Kc(n, i) stored in the memory of the information processing apparatus, and obtains a playlist recording a path to be played back based on the obtained version number. The processing for obtaining the playlist based on the version number is performed by executing a movie object program as the playback program (see FIG. 2) belonging to the CPS unit. The configuration of the movie object is discussed in the following section.

As the path that can be played back by each information processing apparatus, the sole path is determined based on the version number associated with the CPS unit determined by the information processing apparatus. The arrows indicated by v0 and v1 shown in the upper part (a) of FIG. 3 respectively indicate an example of the path set by the information processing apparatus that has obtained the version number 0(v0) associated with the CPS unit to which this content, i.e., xx story, belongs and an example of the path set by the information processing apparatus that has obtained the version number 1(v1). That is, the playback path is determined by the version.

In the example shown in FIG. 3, the information processing apparatus having version 0(v0) selects data of variation number 0 in segment 0 and selects data of variation number 1 in segment 1, and so on, and decrypts the data with the corresponding segment keys. The selected data can be represented by the playback sequence indicated in (1) of the lower part (b) of FIG. 3. The information processing apparatus having version 1(vl) selects data of variation1 number 3 in segment 0 and selects data of variation number 3 in segment 1, and so on, and decrypts the data with the corresponding segment keys. The selected data can be represented by the playback sequence indicated in (2) of the lower part (b) of FIG. 3. Concerning the non-segment portions 302, all information processing apparatuses obtain the common key (CPS unit key (Ku)) to decrypt the same data.

Although in FIG. 3, for the sake of convenience, the version number and the path number are the same, they do not have to be the same. In FIG. 3, the path set for version 0 is path number 0, and the path set for version 1 is path number 1. If the number of segments is 15 and if the number of variations is 16, 1615 different paths can be set.

As in the number of paths, 1615 different versions can be set. That is, different versions for each piece of content may be set for individual information processing apparatuses. Alternatively, for a certain CPS unit, one version may be set for information processing apparatuses having the same machine type. That is, for one CPS unit, the same version is set for information processing apparatuses having the same machine type.

Although in reality $16^{15}$ different versions can be set, the 256 versions from 0 to 255 are set in the following example.

An information processing apparatus that has obtained 256 versions from version 0 to version 255 for a certain piece of content performs a playback operation according to the different paths from path 0 to path 255.

Figure 4:
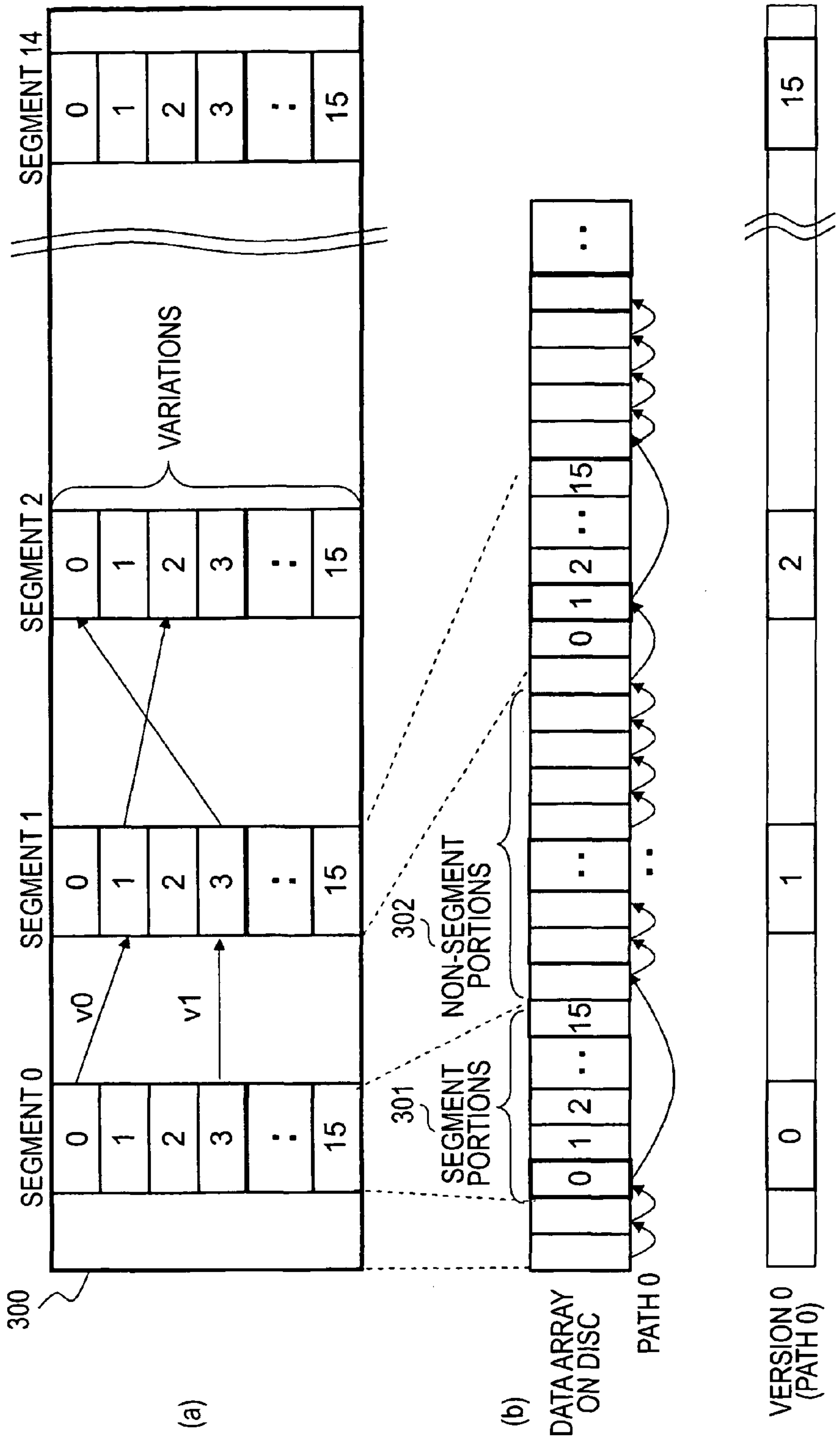

The data array structure of content stored in an information recording medium is described below with reference to FIG. 4. In FIG. 4, the upper part (a) illustrates a segment structure similar to that shown in FIG. 3. The actual data array on a disc, which serves as an information recording medium, is the array shown in the lower part (b) of FIG. 4. That is, the segment portions 301 and the non-segment portions 302 are alternately disposed. In each segment portion 301, the segment data corresponding to the different variation numbers 0 to 15 are disposed.

The arrows indicated in (b) of FIG. 4 indicate the playback path (path 0) of the information processing apparatus that has obtained version 0(v0) as the version corresponding to the playback content. The non-segment portions 302 are the data common to all the versions and can be played back by being decrypted with the above-described CPS unit key. The segment portion 301 is the data of the same scene encrypted with different cryptographic keys 0 to 15, and from those data, one variation data determined based on the version is selected and decrypted.

Variation identification information is recorded by, for example, digital watermark, on each segment data associated with a variation number set in each segment. If there are 16 variations from 0 to 15 in each segment, as shown in FIGS. 3 and 4, identification information for identifying to which variation each segment data belongs is embedded in the segment data. For example, numerical value data associated with the variation numbers 0 to 15 are embedded as digital watermark. With this arrangement, if an unauthorized copy disc is distributed later, it is possible to analyze the path of the unauthorized copy data to specify the copy source.

On the basis of the unit classification number associated with a CPS unit to be played back and data set in a unit classification key file stored in the information processing apparatus, the information processing apparatus obtains the version number associated with the CPS unit to obtain a playlist determined by the obtained version number, thereby performing a playback operation based on the playlist. By performing a playback operation based on the selected playlist, the playback operation according to the specific playback path can be performed.

The path can be set in each playlist contained in the CPS unit as desired by a content production or editing entity, and desired paths can be assigned to the information processing apparatuses having version 0 to 255 in accordance with content belonging to the content management units.

2.3. CPS Unit Key File

As discussed with reference to FIG. 2, a unit classification number is assigned to a content management unit (CPS unit) stored in an information recording medium. Setting information concerning unit classification numbers assigned to a plurality of content management units (CPS units) stored in the information recording medium is stored in the CPS unit key file 115 shown in FIG. 1.

The specific structure of the CPS unit key file is discussed below with reference to FIGS. 5 and 6. FIG. 5 illustrates the structure of the CPS unit key file as a table, and FIG. 6 is a syntax diagram illustrating the data structure of the actual file. The CPS unit key file is divided into, as shown in FIG. 5, index information, such as titles, which are associated with content management unit numbers (CPS unit numbers), unit classification numbers (movie segment numbers), and encrypted CPS unit keys Kun.

The unit classification numbers (movie sequence numbers) are associated with, for example, numbers 0 to 254, and one of the 255 unit classification numbers 0 to 254 is set in each content management unit (CPS unit). Unit classification numbers are set by a content production or editing entity.

The CPS unit key file shown in FIG. 5 corresponds to the data structure shown in FIG. 2. For example, title 1 and title 2 belong to the same CPS unit (CPS1), and the unit classification number 14 is set in the CPS unit (CPS1). Application 1 belongs to the CPS unit (CPS2), and the unit classification number 35 is set in the CPS unit (CPS2).

On the basis of the unit classification number set in each CPS unit and data stored in the unit classification key file stored in an information processing apparatus to play back content, the information processing apparatus obtains the version number associated with the CPS unit and plays back the content based on the playlist determined by the version. In this case, path information has been set in the playlist. That is, the information processing apparatus selects and decrypts one segment data in each segment portion of the content discussed with reference to FIG. 3.

FIG. 6 is a syntax diagram illustrating the data structure of the CPS unit key file shown in FIG. 5. A data portion 321 is a recording area in which definition information concerning the CPS unit number associated with each index is recorded. A data portion 322 is a recording area in which definition information concerning the unit classification number for each CPS unit and a cryptographic CPS unit key for each CPS unit are recorded.

2.4. Segment Key File

The detailed configuration of the segment key file 116 (see FIG. 1) stored in the information recording medium 100 is discussed below with reference to FIGS. 7 through 9. The segment key file 116 is set for each content management unit (CPS unit) stored in the information recording medium 100. That is, if there are n CPS units stored in the information recording medium 100, n segment key files are set and recorded in the information recording medium 100.

FIG. 7 illustrates the structure of the segment key file as a table, and FIGS. 8A and 8B are a syntax diagram illustrating the data structure of the actual segment key file. The segment key file is configured, as shown in FIG. 7, such that unit versions are associated with encrypted data of segment keys for segments 0 to 14.

In the unit version V(n, i), n represents the path number 0 to 255, and i designates the unit classification number. The path number is the path identification number which is set by selecting one segment data in each segment portion described with reference to FIGS. 3 and 4. As stated above, the path is determined based on the version number associated with a CPS unit, the version number being determined based on the unit classification number set in the CPS unit and the data stored in the unit classification key file: Kc(n, i) stored in the memory of an information processing apparatus. That is, one path is determined based on one version number. Although the version number is equal to the path number in this description, this is only for the sake of convenience, and it is not necessary that the version number and the path number coincide with each other.

In the unit version V(n, i), i designates the unit classification number. Since title 1 shown in FIGS. 2 and 5 corresponds to CPS unit 1, and since the classification number of the CPS unit 1 is 14, the unit versions (0, 14) through (255, 14) are set for the content associated with title 1 of the CPS unit 1.

To play back the content, an information processing apparatus selects one of the 256 unit versions (0, 14) through (255, 14) and obtains the encrypted segment-key generating key Ks'(x, y) in the entry of each of the segments 0 to 14 associated with the selected row of the table. The information processing apparatus then decrypts the encrypted segment-key generating key Ks'(x, y) to obtain the segment-key generating key Ks'(x, y), and further obtains the segment key Ks(x, y) based on the segment-key generating key Ks'(x, y) to decrypt one segment data corresponding to one of variation numbers 0 to 15 set in each of segments 0 to 14. The specific processing thereof is described below.

In the segment key file shown in FIG. 7, encrypted segment-key generating keys, i.e., [Enc(Ke'(n, i), Ks'(x, y)], are stored in segments 0 to 14. Enc(a, b) indicates that b is encrypted with a. In Ke'(n, i), as in n and i in the unit version V(n, i), n is the path number 0 to 255, and i is the unit classification number. In Ks'(x, y), x is the segment number (0 to 14), and y is the variation number (o to 15). The segment number and the variation number have been discussed with reference to FIG. 3. The key Ke'(n, i) is a key that can be generated based on the data stored in the information processing apparatus and the data stored in the information recording medium. The generation of this key is described in the following section.

To play back the content, an information processing apparatus selects one of the 256 unit versions (0, i) through (255, i) and obtains the encrypted segment-key generating key Ks'(x, y) in the entry of each of the segments 0 to 14 associated with the selected row of the table.

The unit version to be selected is determined based on the unit classification number set for the CPS unit associated with content to be played back and the data stored in the unit classification key file stored in the memory of the information processing apparatus. For example, according to the version number determined based on the unit classification number and the data stored in the unit classification key file, the playlist in which one path is set is selected. The selected playlist is formed of play items in accordance with one of the paths in the 256 unit versions (0, i) through (255, i). By performing a playback operation according to the playlist, the content can be played back in accordance with one of the paths in the 256 unit versions (0, i) through (255, i) shown in FIG. 7.

For example, the information processing apparatus that selects the version (0, i) at the topmost section in FIG. 7 as the playback path can obtain the encrypted segment-key generating key Ks'(0, 3) in segment 0 to select and decrypt the segment data having segment number 0 and variation number 3, and can obtain the encrypted segment-key generating key Ks'(1, 2) in segment 1 to select and decrypt the segment data having segment number 1 and variation number 2. In this manner, the 256 unit versions (0, 14) through (255, 14) are associated with different paths, and the information processing apparatus plays back the content by selecting segment data in accordance with the single path selected from the 256 paths.

The actual path setting information is recorded in a playlist discussed with reference to FIG. 2. That is, the playlists associated with the 256 paths are set, and by performing a playback operation according to the playlist selected by the unit version, the information processing apparatus selects one of the paths corresponding to the unit version in the table shown in FIG. 7 and then plays back the content. Setting the paths based on the playlists and play items is discussed in the following section with reference to FIG. 12.

FIGS. 8A and 8B are a syntax diagram illustrating the data structure associated with the segment key file shown in FIG. 7. A data portion 331 is a recording area in which a CPS unit number that plays back content by using a sequence key, which is a combination of a specific segment key and a CPS unit key, is recorded. A data portion 332 is a recording area in which definition information corresponding to the table shown in FIG. 7, i.e., playlists associated with the 256 unit versions, play items in the playlists, and encrypted segment-key generating keys Ks'(x, y) in each segment are recorded. In the table shown in FIG. 7, only the encrypted segment-key generating keys Ks'(x, y) in each segment are shown. As shown in FIG. 9, however, in the segment key file, playlist IDs and play item IDs in each segment are recorded.

When playing back content, the information processing apparatus selects a playlist and a play item specified by a movie object as a playback program described with reference to FIGS. 11A and 11B.

The playlist is sequence data including play items, which are playback units according to a playback path, and is set as a play item string in which segment portions and non-segment portions, such as those discussed with reference to FIG. 3, are arranged according to the playback path. A playlist ID and a play item ID are set as identifiers for each playlist and each play item, respectively, and when playing back content, the information processing apparatus refers to the segment key file to determine whether the playlist and the play item have the same playlist ID and play item ID as those set in the segment key file. If the two IDs coincide with each other, the information processing apparatus determines that the corresponding segment data is to be played back, and generates the segment keys, thereby decrypting the data of one of variations 0 to 15 in each segment according to the play items in the playlist.

2.5. Unit Classification Key File

A description is now given, with reference to FIG. 10, of the unit classification key file stored in the memory of an information processing apparatus to play back content. FIG. 10 illustrates the configuration of the unit classification key file stored in the memory 154 of the information processing apparatus 150 as a table. As discussed with reference to FIG. 1, the information processing apparatus 150 stores the unit classification key file: Kc(n, i) in the memory 154.

The unit classification key file is configured, as shown in FIG. 10, such that the unit classification number is associated with the unit version V(n, i) and the unit classification key Kc(n, i). As in the unit version V(n, i) of the segment key file discussed with reference to FIG. 7, in the unit version V(n, i) and the unit classification key Kc(n, i), n represents the path number 0 to 255, and i designates the unit classification number.

The information processing apparatus 150 to play back content has 255 unit classification keys corresponding to the unit classification numbers 0 to 254 shown in FIG. 10.

As stated above, the unit classification number is the number set for each content management unit (CPS unit). The information processing apparatus 150 selects the unit classification key based on the unit classification number of content to be played back. For example, when playing back content corresponding to the CPS unit having unit classification number 0, the information processing apparatus 150 storing the table shown in FIG. 10 selects the unit classification key: Kc(35, 0). The specific processing performed in playing back content is discussed below.

2.6. Movie Object

The structure of a movie object as a content playback program contained in a content management unit recorded on an information recording medium is discussed below with reference to FIGS. 11A and 11B. The movie object is a content playback program set in the (B) movie object layer in the hierarchical structure shown in FIG. 2.

The movie object shown in FIGS. 11A and 11B is a program for selecting one of playlists 0 to 255 in accordance with the register set value [reg] (0 to 255) of the information processing apparatus. The register set value [reg] is the version number. The register set value [reg] is the value deduced, when playing back content, from the unit classification number set in the CPS unit associated with the content to be played back and the unit classification key data stored in the information processing apparatus, and is set in the register of the information processing apparatus.

Based on the version number determined by the unit classification number and the data stored in the unit classification key file, a playlist in which one path is set is selected. For example, in the movie object shown in FIGS. 11A and 11B, when the register [reg] set value is 0, playlist 0 is selected and the content is played back. Playlist 0 is a playlist having play items associated with one of the paths in the 256 unit versions (0, i) through (255, i) shown in FIG. 7.

Selecting a playlist and setting a playback path based on a movie object is described below with reference to FIG. 12. The unit classification key file stored in the information processing apparatus is shown in (a) of FIG. 12. The content structure corresponding to one CPS unit stored in the information recording medium is shown in (b) of FIG. 12. In the CPS unit content, unit classification number 5 is set, and a movie object as a playback program is specified based on title #1, and a playlist is selected based on the movie object. The structure shown in FIG. 12 corresponds to the structure of the CPS units discussed with reference to FIG. 2.

Figure 12:
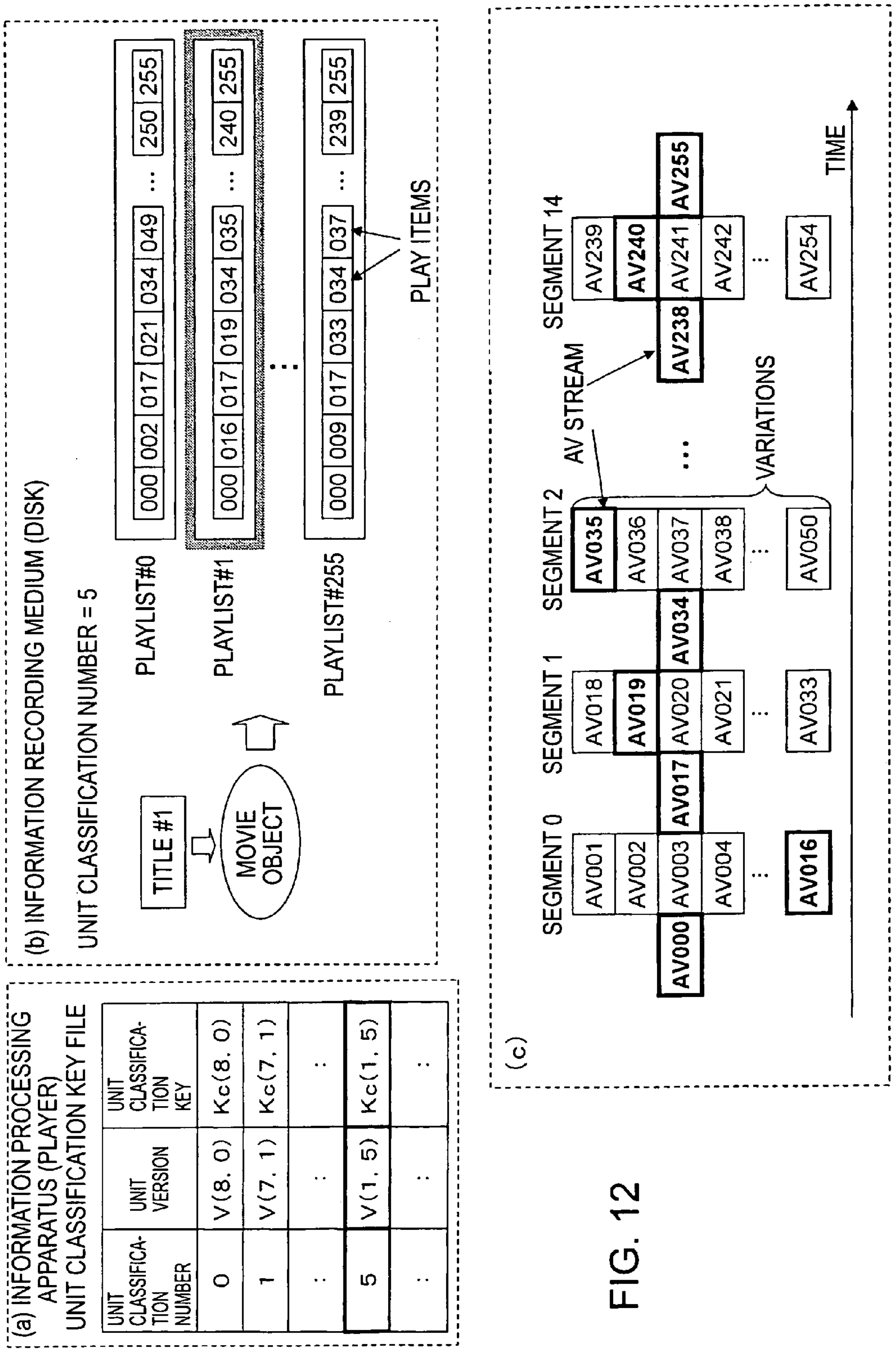
FIG. 12 illustrates selection of a playlist on the basis of a movie object, which is a content playback program, and playback processing on the basis of play items.

The playlists indicated in (b) of FIG. 12 include 255 playlists corresponding to the playback paths, and have different play item sequences. That is, play items are selected such that one segment data is selected in each of segments 0 to 14. For easy understanding, in (b) of FIG. 12, one segment corresponds to one play item. The data amount of a play item may be equal to or different from the data amount of a segment.

The movie object selects one playlist, as discussed with reference to FIGS. 11A and 11B, based on the version number determined by the unit classification number and the data stored in the unit classification key file stored in the memory of the information processing apparatus. In the example shown in FIG. 12, the unit classification number is 5.

In the unit classification key file stored in the memory of the information processing apparatus, the entry in which the unit classification number is 5 is extracted, and the unit version associated with this entry is obtained. In the unit version, V(1, 5) is set. In V(1, 5), 1 is the path number and 5 is the unit classification number. In this case, it is assumed that the path number 1 is the version number obtained in the movie object. The version number may be calculated by using the path number and the unit classification number.

The movie object specifies the playlist associated with each version number, as discussed with reference to FIGS. 11A and 11B, and in this example, playlist 1 is specified for version number 1.

The playlist includes, as indicated in (b) of FIG. 12, sequence information concerning a plurality of play items. Playlist 1 has play item information, such as 000, 016, 017, 019, . . . , and 255. Content is played back by sequentially selecting those play items.

Playback processing by play item 1 is shown in (c) of FIG. 12 in association with segment portions and non-segment portions. The play items specified by play item 1 are, as indicated in (c) of FIG. 12, a sequence of a non-segment portion AV000, a segment portion AV016, a non-segment portion AV017, and so on, one path being set by the playlist. It should be noted that AVxxx is AV stream data corresponding to play item xxx.

In each segment portion, one segment data is selected from segment data including a plurality of variations. In performing playback processing, the segment portions are decrypted with the segment keys and the non-segment portions are decrypted with the unit key.

3. Content Playback Processing in Information Processing Apparatus

A content playback processing sequence in an information processing apparatus is described below with reference to FIGS. 13 and 14. Content stored in an information recording medium has segment portions and non-segment portions, as discussed with reference to FIGS. 3 and 4. The non-segment portions are handled by common processing, i.e., the non-segment portions are played back by the obtained unit key (Ku) regardless of the version of the information processing apparatus. On the other hand, for playing back the segment portions, the path for selecting different segment data according to the version of the information processing apparatus is determined, and the segment data is selected and decrypted in accordance with the path.

Figure 13:
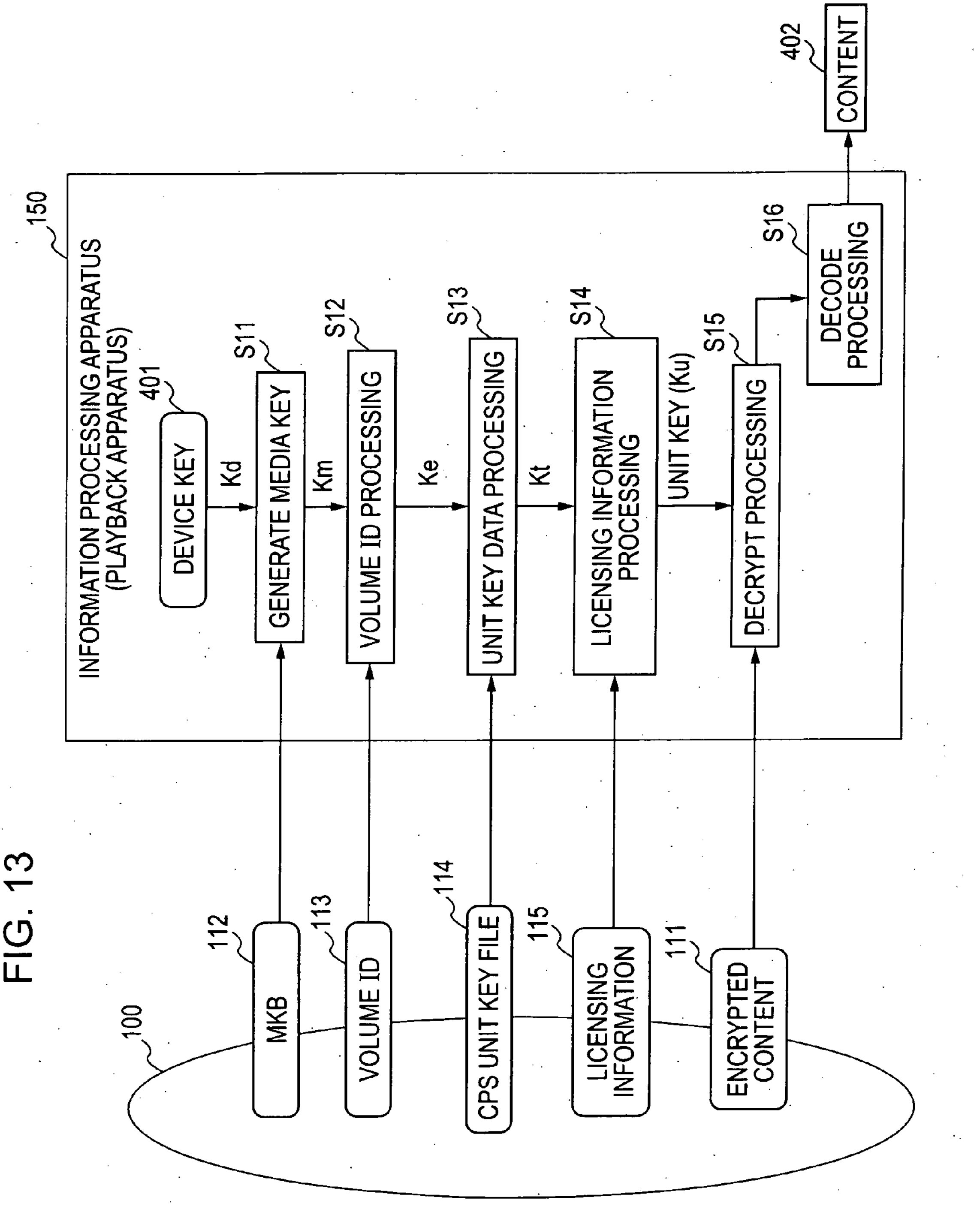
FIGS. 13 and 14 illustrate a content playback processing sequence in an information processing apparatus.
Figure 14:
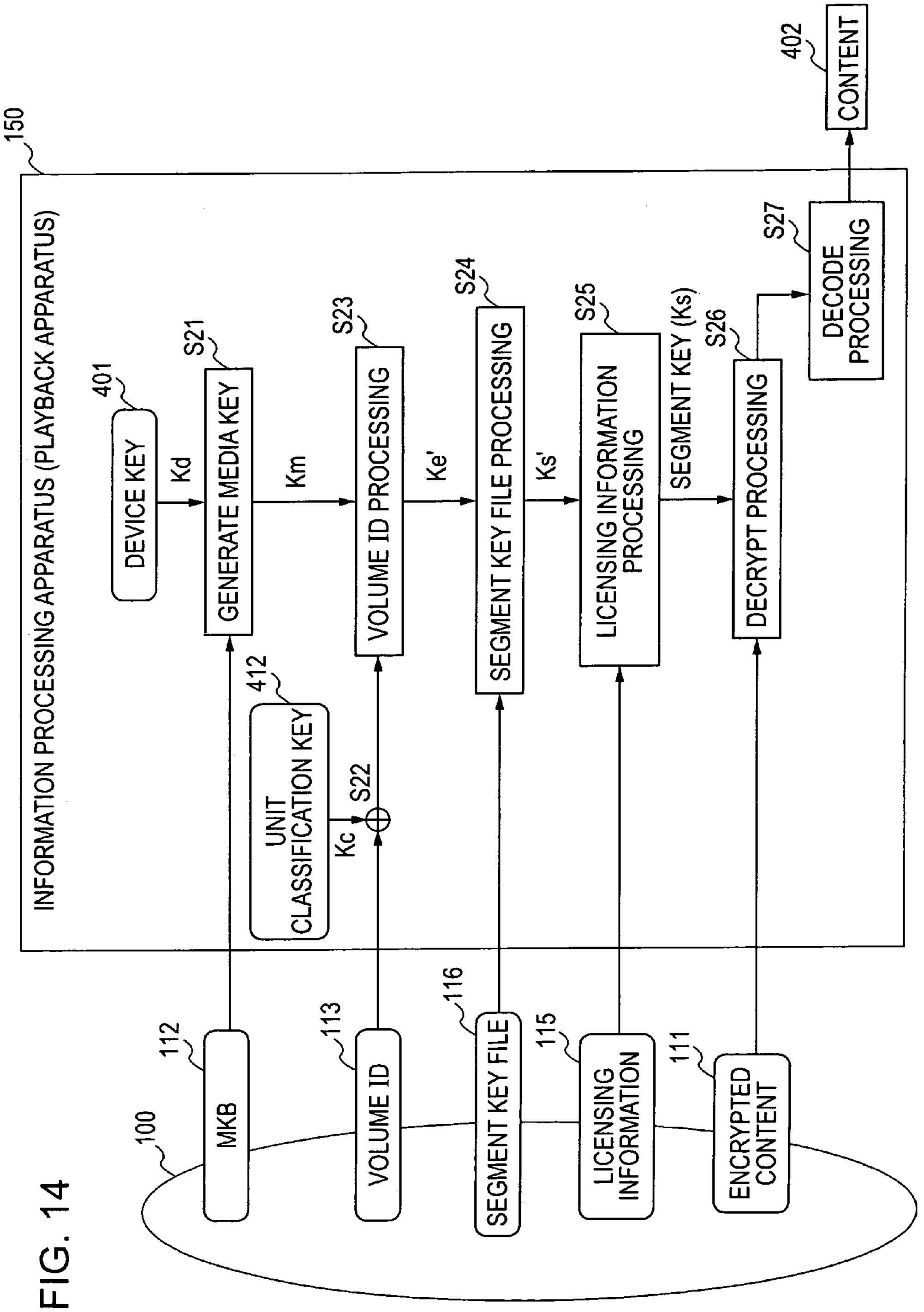

FIG. 13 illustrates playback processing performed by obtaining a unit key (Ku), and FIG. 14 illustrates a playback sequence for playing back segments, i.e., a playback sequence for decrypting segment data by obtaining segment keys (Ks).

The playback sequence performed by obtaining the unit key (Ku) shown in FIG. 13 is first discussed. The information processing apparatus 150 reads various information from the information recording medium 100, and decrypts encrypted content based on a unit key (Ku) generated by key generation processing performed by using the read data and a device key (Kd) 401 owned by the information processing apparatus 150.

The information processing apparatus 150 first reads the device key (Kd) 401 stored in the memory. The device key 401 is a private key stored in the information processing apparatus 150 having a license concerning the content usage.

Then, in step S11, by using the device key 401, the information processing apparatus 150 decrypts the MKB 112, which is a cryptographic key block storing the media key Km therein, stored in the information recording medium 100, thereby obtaining the media key Km.

Then, in step S12, the information processing apparatus 150 performs encrypt processing based on the media key Km obtained in MKB processing in step S11 and the volume ID 113 read from the information recording medium 100, thereby generating a title-key generating key Ke (embedded Key). This key generating processing is executed based on, for example, an advanced encryption standard (AES) encryption algorithm.

Details of the AES encryption algorithm are discussed below with reference to FIG. 15. As the processing based on the AES encryption algorithm, for example, an AES-based hash function AES_H is used. The AES-based hash function is configured as a combination of a key generation processing execution unit (AES_G), which executes data decrypt processing by using AES encrypt processing, and an exclusive-OR unit. The AES_G unit is configured, as shown in FIG. 15, as a combination of an AES decrypt unit (AES_D) and an exclusive-OR unit.

Figure 15:
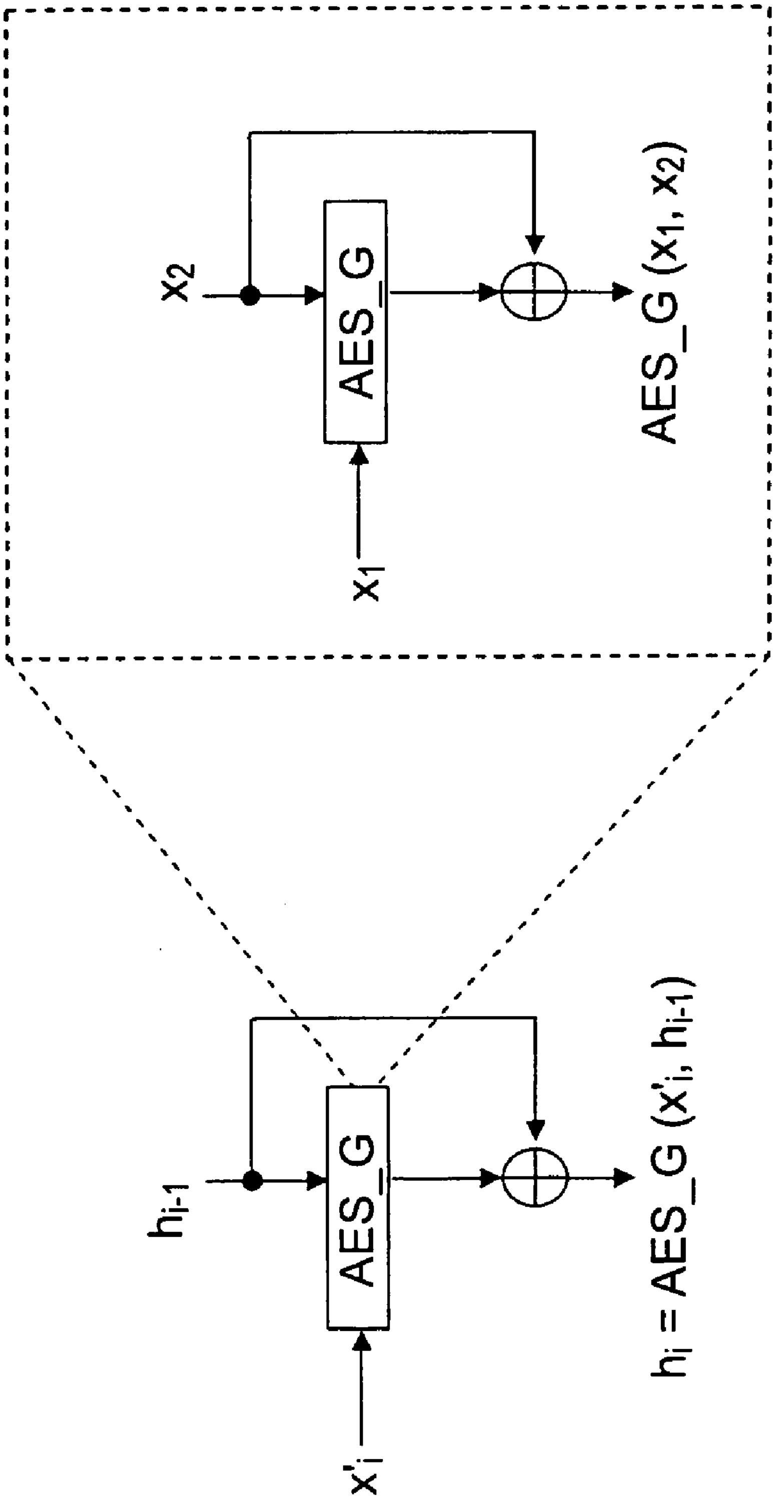
FIG. 15 illustrates details of an advanced encryption standard (AES) encryption algorithm.

The processing for generating the title-key generating key Ke (embedded key) in step S12 in FIG. 13 may be executed by using, for example, the AES-based hash function AES_H shown in FIG. 15, by inputting the media key Km obtained in MKB processing in step S11 and the volume ID 113 read from the information recording medium 100.

Then, in step S13, based on the title-key generating key Ke (embedded key) and the encrypted CPS unit key Kun obtained from the CPS unit key file 114 (see FIGS. 5 and 6) read from the information recording medium 100, unit key data processing, for example, encrypt processing (AES_H), is executed to obtain the title key Kt.

Then, in step S14, the unit key Ku is generated by encrypt processing (AES_H) based on the title key Kt and the licensing information 115 read from the information recording medium 100. In step S15, decrypt processing (for example, AES_D) using the unit key Ku is executed on the encrypted content read from the information recording medium 100.

Then, in step S16, necessary decode processing, such as MPEG-decoding, decompression, and descrambling, is executed so that content 402 can be obtained.

The decrypt processing sequence for non-segment data, which is other than segment portions, has been discussed. In an information recording medium, content without segment portions having a plurality of variations discussed with reference to FIGS. 3 and 4, i.e., content having only non-segments portions, may be included. Such content can be decrypted and played back with the unit key generated in the process as shown in FIG. 13.

For content including segment portions having a plurality of variations discussed with reference to FIGS. 3 and 4, segment keys are generated according to the sequence shown in FIG. 14.

In FIG. 14, the information processing apparatus 150 reads the device key (Kd) 401 stored in the memory. The device key 401 is the device key discussed with reference to FIG. 13, and is a private key stored in the information processing apparatus having a license concerning the content usage.

Then, in step S21, by using the device key 401, the information processing apparatus 150 decrypts the MKB 112, which is a cryptographic key block storing the media key Km therein, stored in the information recording medium 100, thereby obtaining the media key Km.

Then, in step S22, computation based on the volume ID 113 read from the information recording medium 100 and a unit classification key (Kc) 412 stored in the information processing apparatus 150, for example, exclusive-OR (XOR) computation, is executed. The unit classification key (Kc) 412 is selected from the unit classification key file (see FIG. 10) stored in the information processing apparatus 150 on the basis of the unit classification number set in the CPS unit corresponding to the content to be played back.

In step S23, encrypt processing is executed on the computation result in step S22 together with the media key Km obtained in the MKB processing in step S21, thereby generating a title-key generating key Ke'(embedded Key). This key generating processing is executed based on the AES encryption algorithm discussed with reference to FIG. 15.

Then, in step S24, based on the title-key generating key Ke', [Enc(Ke'(n, i), Ks'(x, y))] obtained from the segment key file 116 (see FIGS. 7 and 8) read from the information recording medium 100 is decrypted so that the segment-key generating key Ks'(x, y) is obtained. Based on the segment number to be played back, encrypted data corresponding to one of segments 0 to 14 set in the segment key file 116 is obtained and decrypted.

In step S25, the segment key Ks(x, y) is generated by encrypt processing (AES_H) based on the segment-key generating key Ks'(x, y) and the licensing information 115 read from the information recording medium 100. Then, in step S26, decrypt processing (for example, AES_D) using the segment key is executed on the segment data of the encrypted content read from the information recording medium 100.

The segment data to be selected is one of the variation numbers 0 to 15. The segment data is automatically selected by the playlist. That is, based on the version number determined from the unit classification number of the CPS unit corresponding to content to be played back and the unit classification key file stored in the information processing apparatus 150, the playlist is determined by the movie object. The segment data to be selected corresponds to play items selected by the playlist. In the segment key Ks(x, y), x is the segment number and y is the variation number. The information processing apparatus 150 executes processing for generating a segment key for each segment.

After decrypting the segment data by the generated segment key Ks, in step S27, necessary decoding processing, such as MPEG-decoding, decompression, and descrambling, is executed so that the content 402 can be obtained. The decrypt processing sequence for the segment data has been discussed above.

The processing for segment data and the processing for non-segment data are individually performed as shown in FIGS. 13 and 14, respectively. A content playback processing sequence including both processing operations for segment data and non-segment data by the information processing apparatus 150 is described below with reference to the flowchart in FIG. 16.

Figure 16:
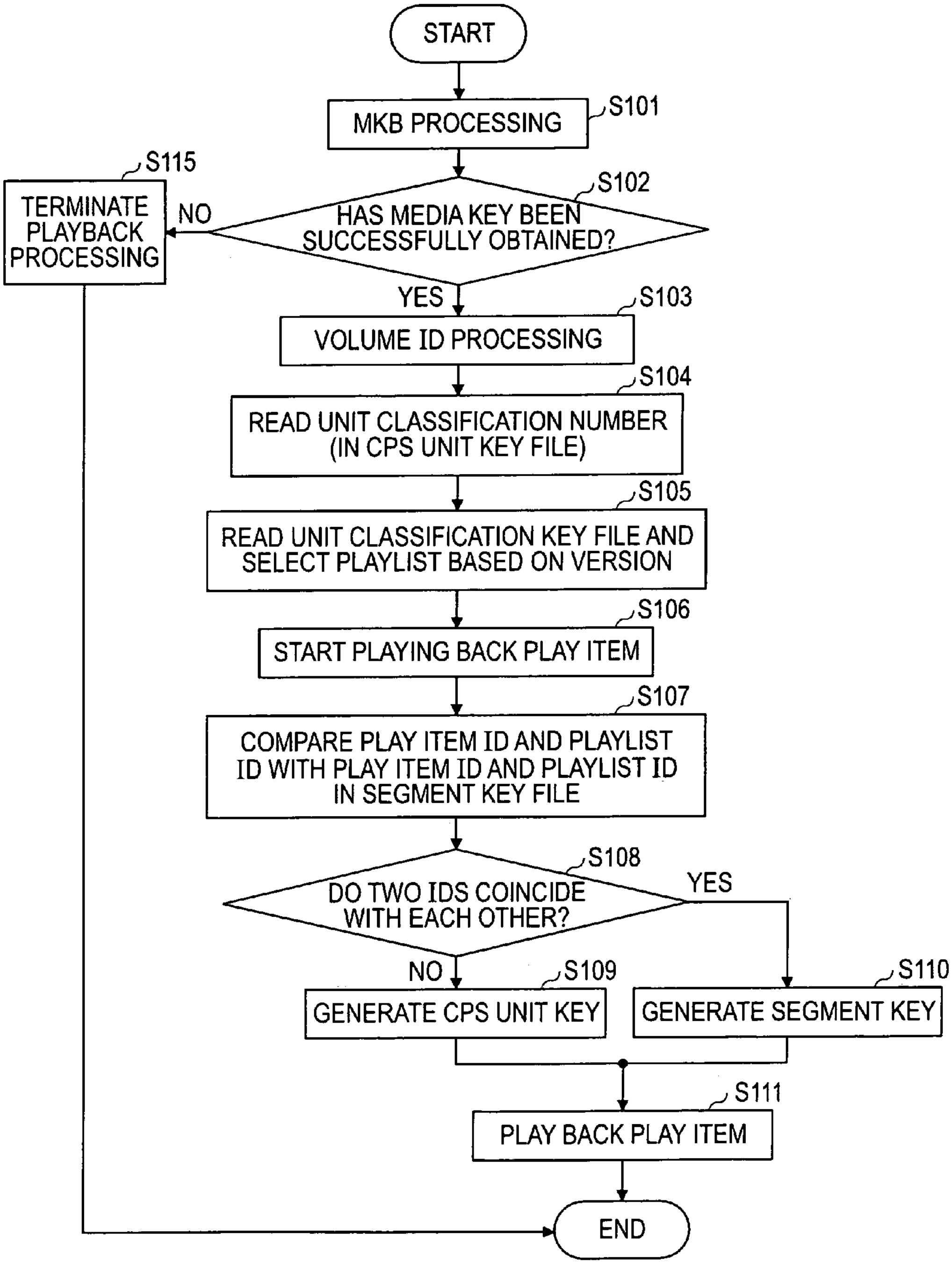
FIG. 16 is a flowchart illustrating a content playback processing sequence.

The individual steps in the flowchart shown in FIG. 16 are as follows. First, the information processing apparatus 150 selects a CPS unit of content to be played back. In the CPS unit, the unit number (#i) as the unit identifier is set, as discussed with reference to FIGS. 2 and 5.

In step S101, the information processing apparatus 150 reads the MKB 112 from the information recording medium 100 and performs encrypt processing using the device key Kd stored in the information processing apparatus 150, thereby obtaining the media key from the MKB 112. This processing corresponds to step S11 in FIG. 13 or step S21 in FIG. 14.

If it is determined in step S102 that the media key has not been obtained successfully, the process proceeds to step S115 in which playback processing is terminated, and the processing is ended. This means that the information processing apparatus 150 is revoked, that is, the information processing apparatus 150 is not authenticated as an authorized playback apparatus. The MKB 112 is suitably updated so that unauthorized devices can be prevented from obtaining the media key by using the device keys.

If it is determined in step S102 that the media key has been obtained successfully, the process proceeds to step S103 in which the processing using the volume ID 113 read from the information recording medium 100 is executed. By the processing using the volume ID 113, the title-key generating key Ke (embedded Key) is generated. This processing corresponds to step S12 in FIG. 13.

Then, in step S104, the unit classification number is read from the CPS unit key file (see FIGS. 5 and 6) stored in the information recording medium 100. Then, in step S105, the unit classification key file (see FIG. 10) stored in the memory of the information processing apparatus 150 is read so that the unit version can be obtained based on the unit classification number of content to be played back and the unit classification key file, and the playlist is selected by the movie object based on the unit version (see FIGS. 11A through 12).

Then, in step S106, the playback operation of the play items is started. The play items are information, as discussed with reference to FIGS. 2 and 12, for specifying playback zones contained in the playlist designated by the playback program of content to be played back. The play items are contained in the playlist selected based on the playback program (movie object) discussed with reference to FIGS. 11A through 12.

Then, in step S107, the ID of the playlist selected by the playback program (movie object) and the play item ID are compared with the playlist ID and the play item ID set in the segment key file (see FIGS. 7 through 9) corresponding to the CPS unit associated with the content to be played back. If the playlist ID and the play item ID coincide with those in the segment key file, it is determined that the corresponding data is segment data to be played back. Then, in step S110, the segment key is generated, and in step Sill, the play item as the segment data is decrypted and played back. The processing for generating the segment key executed in step S110 is performed in accordance with the sequence discussed with reference to FIG. 14.

If, in step S107, the ID of the playlist selected by the playback program (movie object) and the play item ID do not coincide with the playlist ID and the play item ID set in the segment key file (see FIGS. 7 through 9) corresponding to the CPS unit associated with the content to be played back, it is determined that the corresponding data is not segment data, but non-segment data. Then, in step S109, the unit key is generated, and in step Sill, the play item as the non-segment data is decrypted and played back. The processing for generating the unit key executed in step S109 is performed in accordance with the sequence discussed with reference to FIG. 13.

4. Manufacturing Process for Information Recording Medium

Details of the manufacturing process for the above-described information recording medium storing content therein are described below with reference to, for example, FIG. 17.

Figure 17:
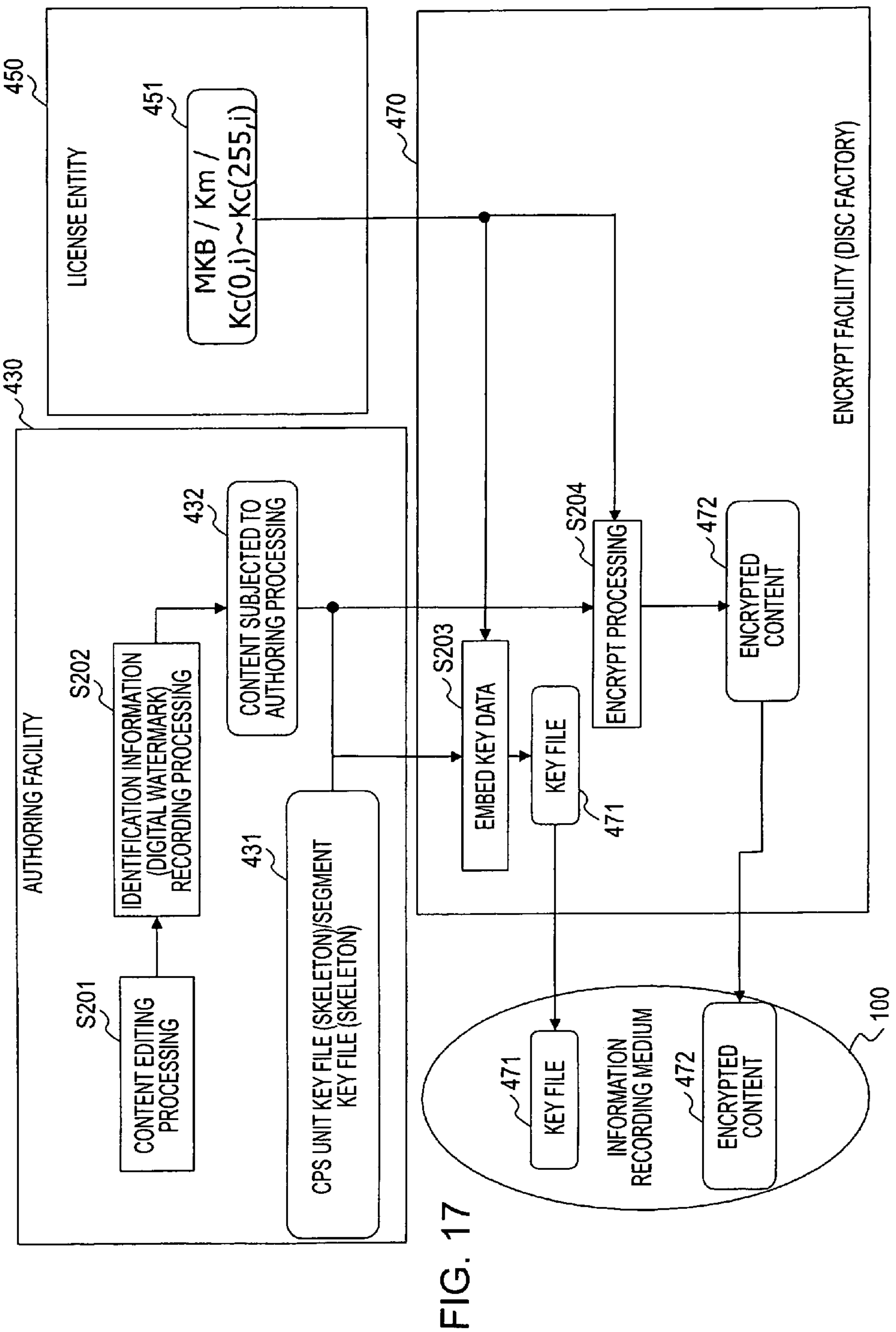
FIG. 17 illustrates details of a manufacturing process for an information recording medium storing content therein.

There are three entities, as shown in FIG. 17, that are involved in the manufacturing of an information recording medium storing content therein. The three entities are an authoring facility 430 for performing content editing processing, a license entity 450 for managing the usage of content and generating and managing MKB and various key data 451, and a disc factory 470 for manufacturing an information recording medium.

First, in step S201, the authoring facility 430 performs content editing processing on content to be stored in an information recording medium. The content editing processing is the processing for generating content to be recorded on an information recording medium based on original content. The editing processing includes constructing content having a hierarchical structure discussed with reference to FIG. 2, setting content management units (CPS units), generating licensing information for the content management units (CPS units), and setting segment data portions and non-segment data portions discussed with reference to FIGS. 3 and 4. In the editing processing, however, encrypt processing is not performed, and data is divided into sections to determine which sections are to be used as segments. Also, the number of segments and the number of variations to be set in each segment are determined, and paths are also set. Segment data in accordance with the number of variations to be set in each segment is also generated.

Then, in step S202, identification information is recorded on data in accordance with the number of variations set in each segment. That is, if there are 16 variations from 0 to 15 in each segment, as shown in FIG. 3, identification information for identifying each segment data is embedded into the corresponding segment data. For example, numeric data 0 to 15 are embedded as digital watermark. With this arrangement, if an unauthorized copy disc is distributed later, it is possible to analyze the path of the unauthorized copy data to specify the copy source.

In this manner, content 432 subjected to authoring processing is generated and the generated content 432 is provided to the disc factory 470. The content 432 contains licensing information.

The authoring facility 430 also generates a skeleton key file 431, which serves as a skeleton for a CPS unit key file and a skeleton for a segment key file to be recorded on an information recording medium, and supplies the generated skeleton key file 431 to the disc factory 470.

The skeleton key file 431 is skeleton data for a CPS unit key file and a segment key file without key information. Processing for storing keys in those files is performed in the disc factory 470.

The data structure of a skeleton CPS unit key file without key information is shown in FIG. 18. The CPS unit key file including key information has the structure discussed with reference to FIGS. 5 and 6. A data portion 433 is a recording area in which definition information concerning a CPS unit number associated with each index is recorded. A data portion 434 is a recording area in which definition information concerning a unit classification number of each CPS unit and an encrypted CPS unit key corresponding to each CPS unit are recorded. In the skeleton CPS unit key file, all zeros are embedded in an encrypted CPS unit key recording area 435 without recording key data.

In the disc factory 470, an encrypted CPS unit key is recorded in the area with all zeros, thereby generating a CPS unit key file having the structure discussed with reference to in FIG. 6. The generated CPS unit key file is then recorded on the information recording medium.

FIGS. 19A and 19B illustrate the data structure of a skeleton segment key file without key information. A segment key file including key information has the structure discussed with reference to FIGS. 7 through 9. A data portion 436 is a recording area in which a CPS unit number to play back content by using a sequence key, which is a combination of a specific segment key and a CPS unit key, is recorded. A data portion 437 is a recording area in which playlists corresponding to the 256 unit versions, play item information in each playlist, and an encrypted segment-key generating key [Enc(Ke'(n, i), Ks'(x, y))] for each segment are recorded. In the skeleton segment key file, all zeros are embedded in an encrypted segment-key generating key [Enc(Ke'(n, i), Ks'(x, y))] recording area 438 without recording key data.

In the disc factory 470, the encrypted segment-key generating key [Enc(Ke'(n, i), Ks'(x, y))] is recorded in the area with all zeros, thereby generating a CPS unit key file having the structure discussed with reference to FIGS. 7 through 9. The generated CPS unit key file is then recorded on the information recording medium.

The disc factory 470, which encrypts content as an encrypting facility, receives the content 432 subjected to authoring processing and the skeleton key file 431 without key information from the authoring facility 430. The disc factory 470 also receives the key data 451 from the license entity 450.

The key data 451 includes:

MKB, which serves as a cryptographic key block, storing the media key Km therein and enabling the acquisition of the media key Km only by using the device key Kd stored in licensed information processing apparatuses;

media key Km; and unit classification key Kc(0, i) to Kc(255, i). In Kc(0, i) to Kc(255, i), i is the unit classification number, and 0 to 255 indicate the path number.

In step S203, the disc factory 470 completes the key files, i.e., the CPS unit key file (see FIGS. 5 and 6) and the segment key file (see FIGS. 7 through 9), based on the received information. That is, in the skeleton CPS unit key file, the disc factory 470 records the encrypted CPS unit key in the area with all zeros to complete the CPS unit key file having the configuration discussed with reference to FIG. 6. In the skeleton segment key file, the disc factory 470 records the encrypted segment-key generating key [Enc(Ke'(n, i), Ks'(x, y))] in the area with all zeros to complete the segment key file having the structure discussed with reference to FIGS. 8A and 8B. The disc factory 470 then writes a key file 471 generated as discussed above into the information recording medium 100.

The processing for generating the CPS unit key and the encrypted segment-key generating key [Enc(Ke'(n, i), Ks'(x, y))] is performed by using the information received from the license entity 450 and the information received from the authoring facility 430, and required key data and ID information are generated by random-number generating processing in the disc factory 470.

Then, in step S204, the disc factory 470 performs encrypt processing for the content. This encrypt processing is executed on the content having the data structure discussed with reference to FIGS. 3 and 4, and non-segment portions are encrypted by using the unit key while segment portions are encrypted by using a segment key selected for each variation of each segment. The unit key and the segment keys have structures in association with the CPS unit key file and the segment key file, respectively.

Encrypted content 472 generated by the encrypt processing in step S204 is recorded on the information recording medium 100. Although it is not shown, the disc factory 470 writes the MKB 112, the volume ID 113, and licensing information into the recording medium 100, thereby generating the information recording medium 100 having the recording data discussed with reference to FIG. 1.

Figure 20:
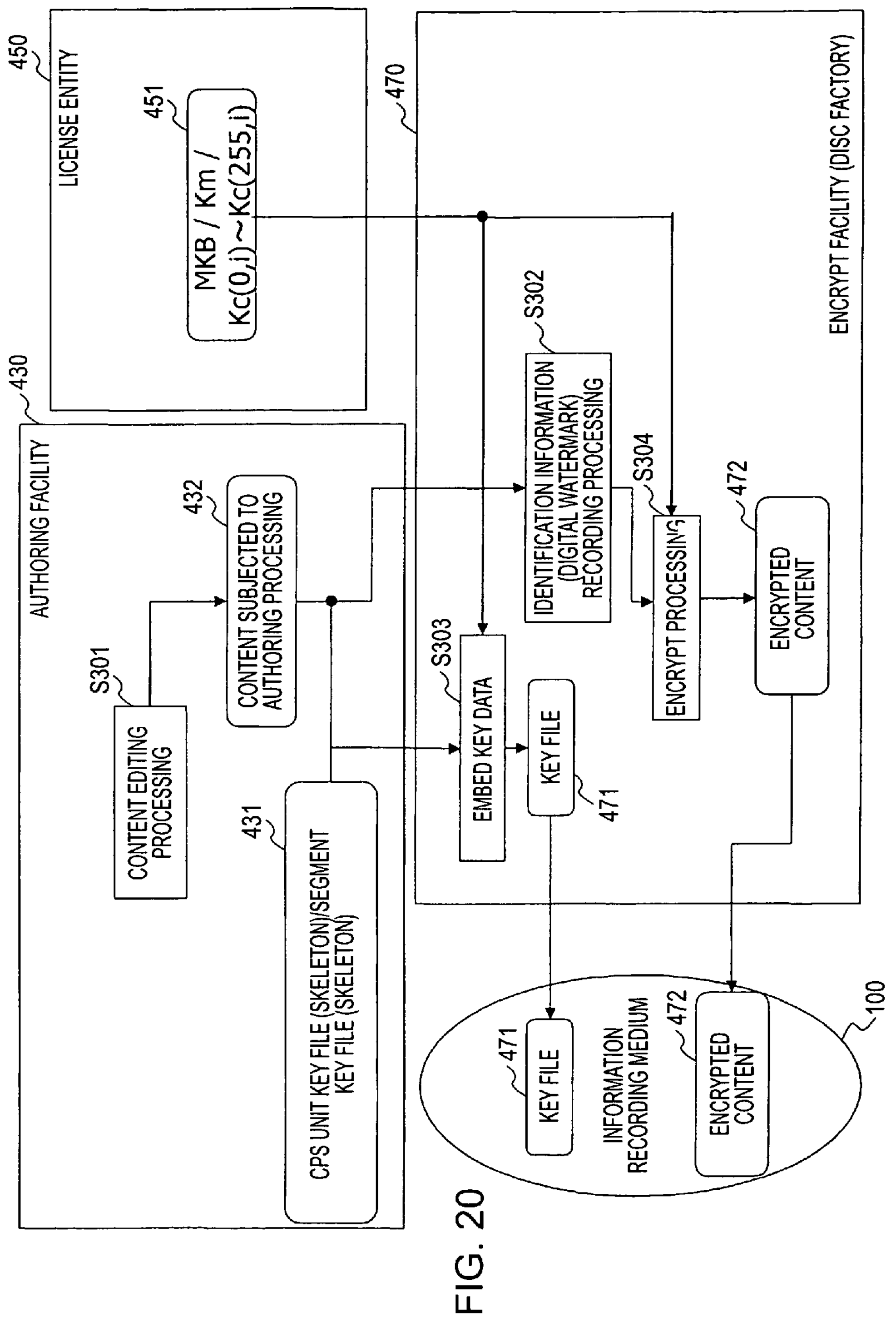
FIG. 20 illustrates details of a manufacturing process for an information recording medium storing content therein.

In the manufacturing process for the information recording medium 100 shown in FIG. 17, identification information (digital watermark) for the segment data is embedded by the authoring facility 430. However, identification information (digital watermark) for the segment data may be embedded by the disc factory 470, as shown in FIG. 20.

When performing the content encrypt processing in the disc factory 470, an auxiliary file is used for efficiently performing the encrypt processing. The structure of the auxiliary file is discussed below with reference to FIGS. 21 and 22. FIG. 21 illustrates the data structure of the auxiliary file used for efficiently executing sector-based encrypt processing. FIG. 22 illustrates the meanings of the terms of the auxiliary file shown in FIG. 21.

The auxiliary file has the following data, as shown in FIGS. 21 and 22.

UD_START_Location: Physical Sector Number of the start point of User Data (Data Zone) of each Layer UD_END_Location: Physical Sector Number of the end point of User Data (Data Zone) of each Layer CHT_Location: Physical Sector Number of the start point of CHT CHT_Offset: the number of bytes from the start point of CHT to immediately before Hash Value (data embedded by Mastering Facility)

Content_Cert_Location: Physical Sector Number of the start point of Content Certificate Content_Cert_Offset: the number of bytes from the start point of Content Certificate to immediately before Content ID (data embedded by Mastering Facility)

CRL_Location: Physical Sector Number of the start point of Content Revocation List CRL_Reserved_Length: the number of bytes of the CRL embedding area reserved by Authoring Facility UK_Inf_Location: Physical Sector Number of the start point of Unit_Key.inf (if Unit_Key.inf is not recorded in the corresponding layer, indicate $00000000_{16}$)

UK_Inf_Offset: the number of bytes from the start point of Unit_Key.inf to immediately before Encrypted Unit Key for CPS Unit#1 (if Unit_Key.inf is not recorded in the corresponding layer, indicate $00000000_{16}$)

Num_of_UK: the number of Unit Keys in the overall Disc (=number of CPS Units)

SKF_Location: Physical Sector Number of the start point of Segment Key File (if Unit_Key.inf is not recorded in the corresponding layer, indicate $00000000_{16}$)

Num_of_SK_CPS_Unit: the number of CPS Units of the overall Disc to which Sequence Key is applied MKB_Location: Physical Sector Number of the start point of MKB (if MKB_Cert is not recorded in the corresponding layer, indicate $00000000_{16}$)

MKB_Reserved_Length: the number of bytes of the MKB embedding area reserved by Authoring Facility N: the number of Logical Sectors of Layer i Encryption_Flag: Flag indicating whether encryption is executed Data_Type: Flag indicating the Sector Type CPS_Unit_No: CPS Unit Number/Segment-No : Segment Number/Variation_No : Variation Number Clip_AV_File_No: Clip AV File Number (information used for creating CHT)

Last_Sector_of_Clip: flag indicating the last Sector of each Clip (regardless of the Layer)

Last_Sector_of_Layer: flag indicating the last Sector of each Clip in each Layer In FIG. 21, a data portion 501 provides information concerning data to be recorded on an information recording medium, the positions of key files, and the amount of data. A data portion 502 provides information concerning sector (i). The data portion 502 provides the following information concerning the sector i:

whether encryption is required [Encryption_Flag];

CPS unit number to which sector i belongs [CPS_Unit_No.];

segment number to which sector i belongs [Segment_No.]; and variation number to which sector i belongs [Variation_No.].

For the provision of each segment number, the segment number FFFF is set in the data portions without segment keys, i.e., non-segment data discussed with reference to FIGS. 3 and 4. Similarly, the variation number FFFF is set in non-segment data without segment keys.

Accordingly, when encrypting each sector (i), sectors having FFFF as the segment number and the variation number are encrypted by using the unit key. Sectors having numerical values other than FFFF as the segment number and the variation number, for example, sectors having 0000 to 000D, i.e., 0 to 14, as the segment number, and 0000 to 000E, i.e., 0 to 15, as the variation number, are found to be segment data, and are encrypted with the segment keys associated with the corresponding segments and variations.

As discussed above, the encryption auxiliary file makes it possible to determine whether each sector is segment data or non-segment data. If a sector is found to be segment data, the keys for each sector data, i.e., the unit key and the segment key, can be immediately determined since the corresponding segment number and variation number are recorded, thereby implementing efficient encrypt processing.

Figure 23:
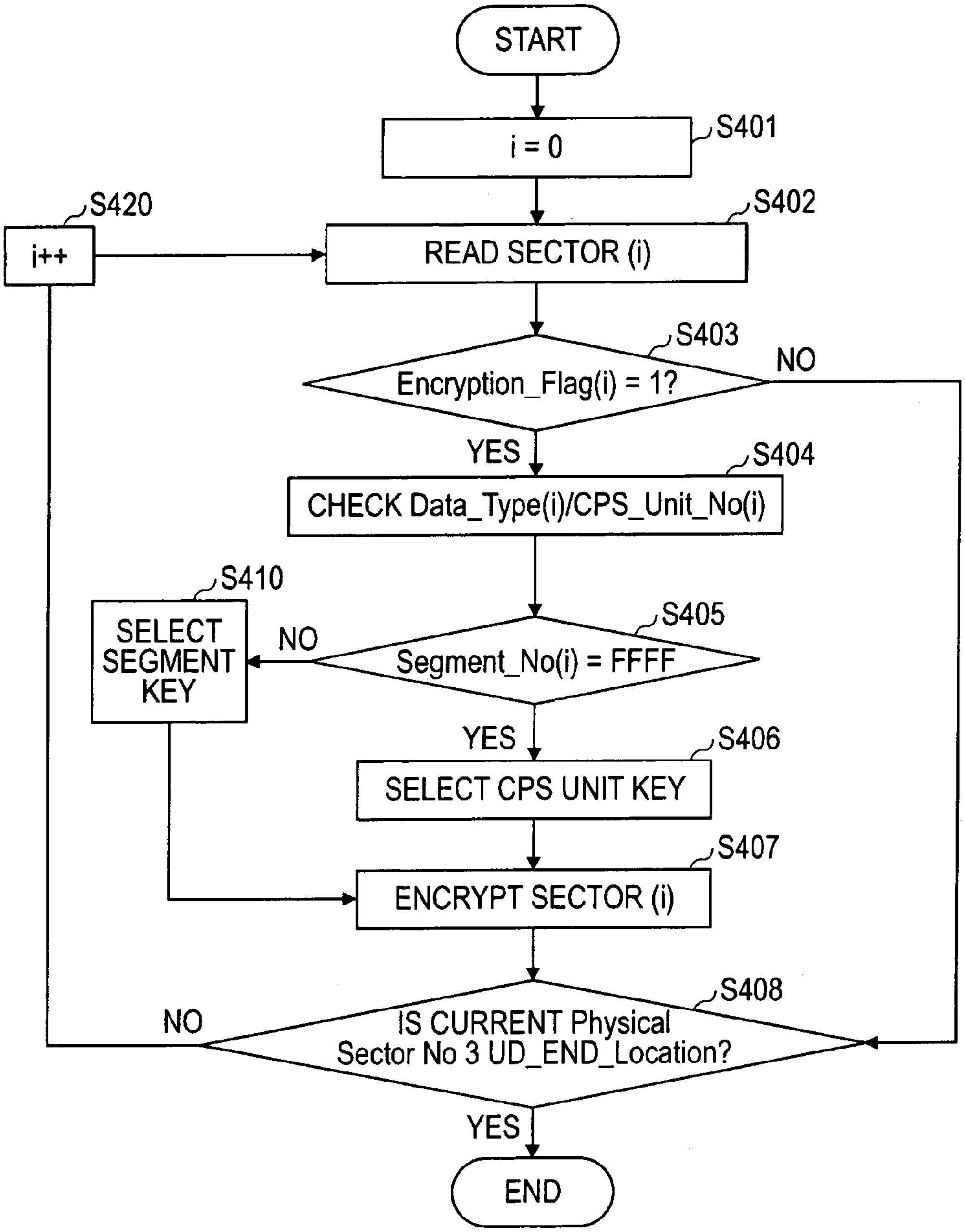
FIG. 23 is a flowchart illustrating content encrypt processing using an encryption auxiliary file.

A description is now given, with reference to the flowchart in FIG. 23, of content encrypt processing by using the encryption auxiliary file. The encrypt processing is executed by reading data in units of sectors from a cutting master, which is original data, to be recorded on an information recording medium. That is, the encrypt processing is executed in units of sectors in the order of the sector number (i). As indicated in the auxiliary file shown in FIG. 21, N sectors (i=0 to N−1) are sequentially processed.

First, in step S401, as the initial processing for the sector number (i), i is set to be 0. In step S402, data corresponding to sector (i) is read from the cutting master. In step S403, Encryption_Flag of sector (i) is read from the auxiliary file shown in FIG. 21 to determine whether encryption is required, i.e., whether Encryption_Flag=1.

If encryption is not required, i.e., Encryption_Flag=0, the process proceeds to step S408. If encryption is required, i.e., Encryption_Flag=1, the process proceeds to step S404.

In step S404, the data type and the CPS unit number of sector (i) are checked by referring to the auxiliary file. Then, in step S405, it is determined by referring to the auxiliary file whether the segment number of sector (i) is FFFF. As stated above, if the segment number is FFFF, the sector is non-segment data. In this case, the process proceeds to step S406 in which the CPS unit key is selected as the cryptographic key for sector (i).

If the segment number is other than FFFF, it means that the sector is segment data. In this case, the process proceeds to step S410 in which the corresponding segment key is selected as the cryptographic key for sector (i). When selecting the segment key, the variation number of the auxiliary file is checked, and the segment key in accordance with the variation number is selected.

The process then proceeds to step S407 in which encrypt processing on sector (i) is executed. If sector (i) is segment data, encrypt processing is executed by using the segment key selected in step S410. If sector (i) is non-segment data, encrypt processing is executed by using the CPS unit key selected in step S406.

Then, in step S408, it is determined whether the processed sector number (i) is the sector located at the end point of user data set in the auxiliary file. If sector number (i) is not located at the end point of the user data, there is another sector data to be processed. The process then proceeds to step S420 in which sector number (i) is incremented, and step S402 and the subsequent steps are repeated on the subsequent sector.

If it is determined in step S408 that the processed sector number (i) is located at the end point of the user data set in the auxiliary file, it means that encrypt processing has been executed on all the sectors, and the processing is completed.

By using the auxiliary file as discussed above, it is determined whether a sector belongs to a segment portion or a non-segment portion, and the key used for encrypt processing can be correctly obtained according to the determination result, thereby enhancing the efficiency in encrypt processing in units of sectors.

The auxiliary file used for generating a segment key file in a disc factory is discussed below with reference to FIGS. 24A and 24B. FIG. 24A illustrates the data structure of an auxiliary file used for generating a segment key file. FIG. 24B illustrates the meanings of the terms in the auxiliary file shown in FIG. 24A.

At the start of the auxiliary file used for generating a segment key file, as shown in FIG. 24, Num_of_CPS_Unit_applied_SK: the number of CPS units to which a sequence key including a segment key string is applied is recorded. Then, a program for obtaining variation numbers required for generating segment key files associated with CPS units that require segment keys is recorded.

The disc factory generates segment keys. The number of segment keys is calculated as follows. The number of segments (15) in each CPS content is multiplied by the number of variations (16) in each segment. The resulting number is further multiplied by the number of CPS units ncu1 resulting in $n_{cu}\times15\times16$ segment keys. Then, based on the segment keys, the disc factory generates encrypted segment-key generating keys [Enc(Ke'(n, i), Ks'(x, y))] and stores them in the segment key file.

In the segment key file, as discussed with reference to FIG. 7, cryptographic key data based on the segment keys associated with various variation numbers in segments 1 to 14 are stored in accordance with the path defined by each unit version. For example, in the path associated with the unit version V(O, i) shown in FIG. 7, the encrypted segment-key generating keys [Enc(Ke'(n, i), Ks'(x, y))] based on the segment keys associated with the following variations are generated and stored in the segment key file.

Segment 0: variation 3
Segment 1: variation 2
Segment 2: variation 4
Segment 14: variation 14

The auxiliary file shown in FIGS. 24A and 24B is a program for sequentially providing the variation numbers 0 to 15 associated with combinations (j, k) of the path number j=0 to 255 and the segment numbers 0 to 14. The use of this program makes it possible to sequentially obtain the variation numbers associated with the combinations (j, k) of the path number j=0 to 255 and the segment numbers 0 to 14. Based on the segment keys corresponding to the obtained variation numbers, encrypted segment-key generating keys [Enc(Ke'(n, i), Ks'(x, y))] are generated according to a predetermined encrypt processing sequence, and are stored in the segment key file.

By using the auxiliary file shown in FIGS. 24A and 24B, the variation numbers can be sequentially obtained, and the segment keys associated with the obtained variation numbers can be correctly obtained, and the encrypted segment-key generating keys [Enc(Ke'(n, i), Ks'(x, y))] can be generated based on the obtained segment keys, thereby efficiently generating the segment key file.

As stated above, the segment key file is set for each CPS unit. When switching the CPS unit number (i) recorded in the auxiliary file, the segment key file to be generated can be switched at the same time. By using the single auxiliary file, key storage processing for a plurality of segment key files associated with CPS units can be efficiently performed.

Figure 25:
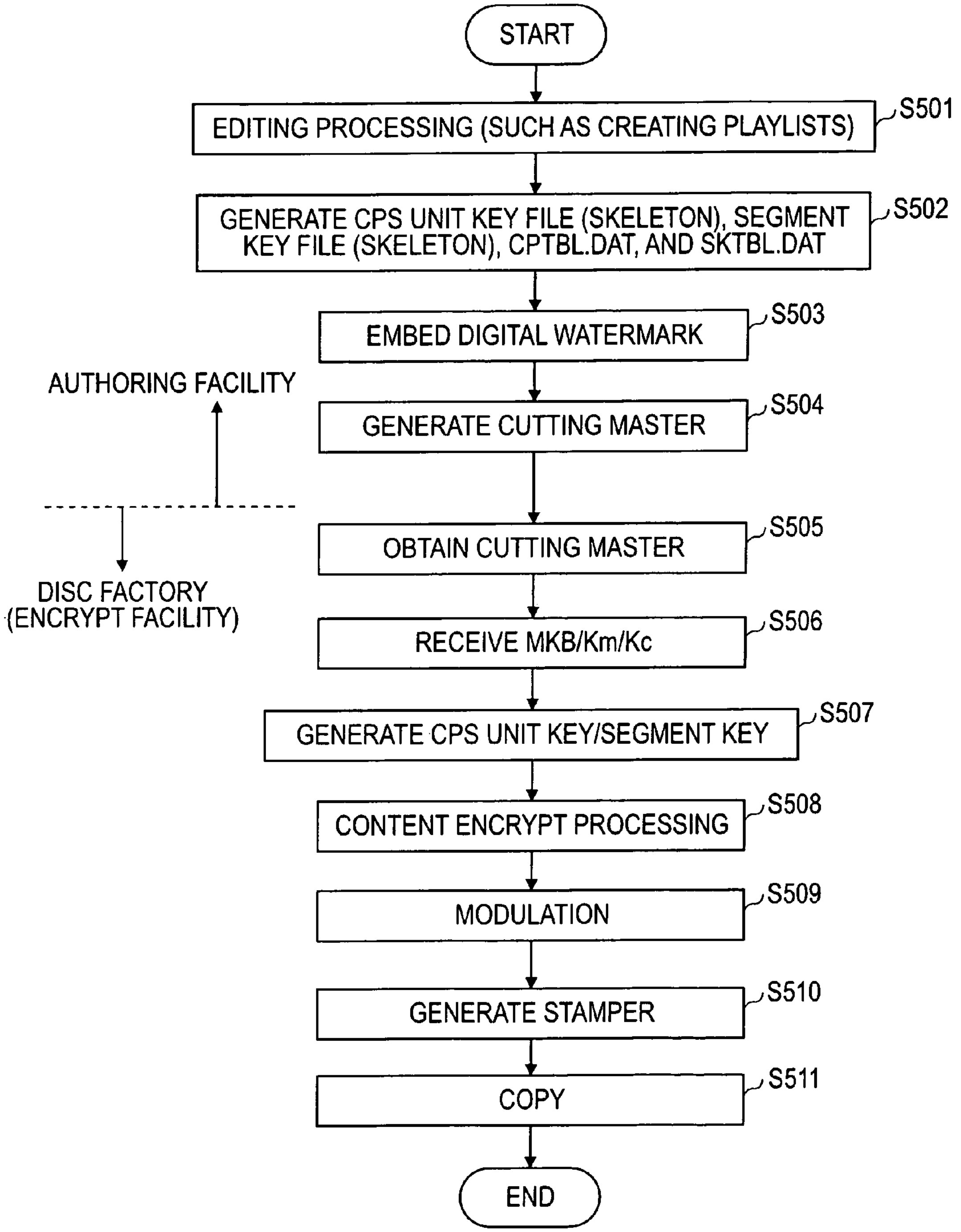
FIG. 25 is a flowchart illustrating a manufacturing method for an information recording medium.

The overall sequence for manufacturing an information recording medium is described below with reference to the flowchart in FIG. 25. In the flowchart in FIG. 25, for example, steps S501 through S504 are performed by the authoring facility 430 shown in FIG. 17, and steps S505 through S511 are performed by the disc factory 470. However, restriction should not be imposed on which step is performed by the authoring facility 430 or the disc factory 470. As discussed with reference to FIG. 20, for example, digital watermark processing in step S503 may be performed in the disc factory 470.

Upon obtaining content materials, the authoring facility 430 executes content editing processing in step S501. The content editing processing includes constructing content having a hierarchical structure discussed with reference to FIG. 2, setting content management units (CPS units), generating licensing information corresponding to content management units (CPS units), and setting segment data portions and non-segment data portions discussed with reference to FIGS. 3 and 4.

Then, in step S502, a CPS unit key file and a segment key file without key information, i.e., skeleton key files discussed with reference to FIGS. 18 through 19B, are generated. For example, key files in which all zeros are set in the key storage areas are generated.

Then, in step S503, identification information is recorded on segment data in accordance with the number of variations of the segments set in the edited content generated in step S501. That is, if there are 16 variations 0 to 15 in each segment, as shown in FIG. 3, identification information for identifying each segment data is embedded in the corresponding segment data. For example, numerical value data 0 to 15 are embedded as digital watermark. With this arrangement, as stated above, if an unauthorized copy disc is distributed later, it is possible to analyze the path of the unauthorized copy data to specify the copy source. The digital watermark embedding processing may be executed in the disc factory 470.

In step S504, a cutting master based on the data generated by the above-described processing is generated. The cutting master is original data to be recorded on an information recording medium, and contains the edited content and the skeleton key files.

Step S505 and the subsequent steps are performed by the disc factory 470. In step S505, the disc factory 470 obtains the cutting master from the authoring facility 430. In step S506, the disc factory 470 stores various key information, i.e., the media key Km, supplied from the license entity 450, and receives the MKB, which serves as a cryptographic key block, that enables the acquisition of the media key Km only when the device key Kd stored in licensed information processing apparatuses is used, the media key Km, and the unit classification keys Kc(0,i) to Kc(255, i). In Kc(0, i) to Kc(255, i), i is the unit classification number and 0 to 255 indicate the path number.

In step S507, the disc factory 470 completes the key files, i.e., the CPS unit key file (see FIGS. 5 and 6) and the segment key file (see FIGS. 7 through 9), based on the received information. More specifically, in the skeleton CPS unit key file, the disc factory 470 records the encrypted CPS unit key in the area with all zeros to complete the CPS unit key file having the structure discussed with reference to FIG. 6. In the skeleton segment key file, the disc factory 470 records the encrypted segment-key generating key [Enc(Ke'(n, i), Ks'(x, y))] in the area with all zeros to complete the segment key file having the structure discussed with reference to FIGS. 8A and 8B. When generating the segment key file, the auxiliary file for generating segment key files discussed with reference to FIGS. 24A and 24B is used.

Then, in step S508, content encrypt processing is performed. This encrypt processing is performed on content having the data structure discussed with reference to FIGS. 3 and 4, and non-segment portions are encrypted with the unit key while the segment portions are encrypted with the segment keys selected for the individual segments and the individual variations. The specific encrypt processing sequence has been discussed above with reference to the flowchart in FIG. 23, and the auxiliary file discussed with reference to FIGS. 21 and 22 is used for the encrypt processing. The encrypt processing is executed in units of sectors by suitably selecting the unit key and the segment keys based on the auxiliary file. The unit key and the segment keys are key data stored in the CPS unit key file and the segment key file, respectively.

Upon completing the generation of the CPS unit key file, the segment key file, and the encrypted content, those data are written into a stamper. By performing data modulation processing in step S509 and stamper generating processing in step S510, a stamper storing the CPS unit key file, the segment key file, and the encrypted content is completed. The MKB, volume ID, and licensing information are also written into the stamper.

Then, in step S511, a disc (information recording medium) is manufactured by using the stamper. The processing is then completed.

A description is now given, with reference to FIG. 26, of an apparatus and method for recording data on an information recording medium by using the auxiliary file discussed with reference to FIGS. 21 and 22 and the auxiliary file discussed with reference to FIGS. 24A and 24B used for generating the segment key file.

Figure 26:
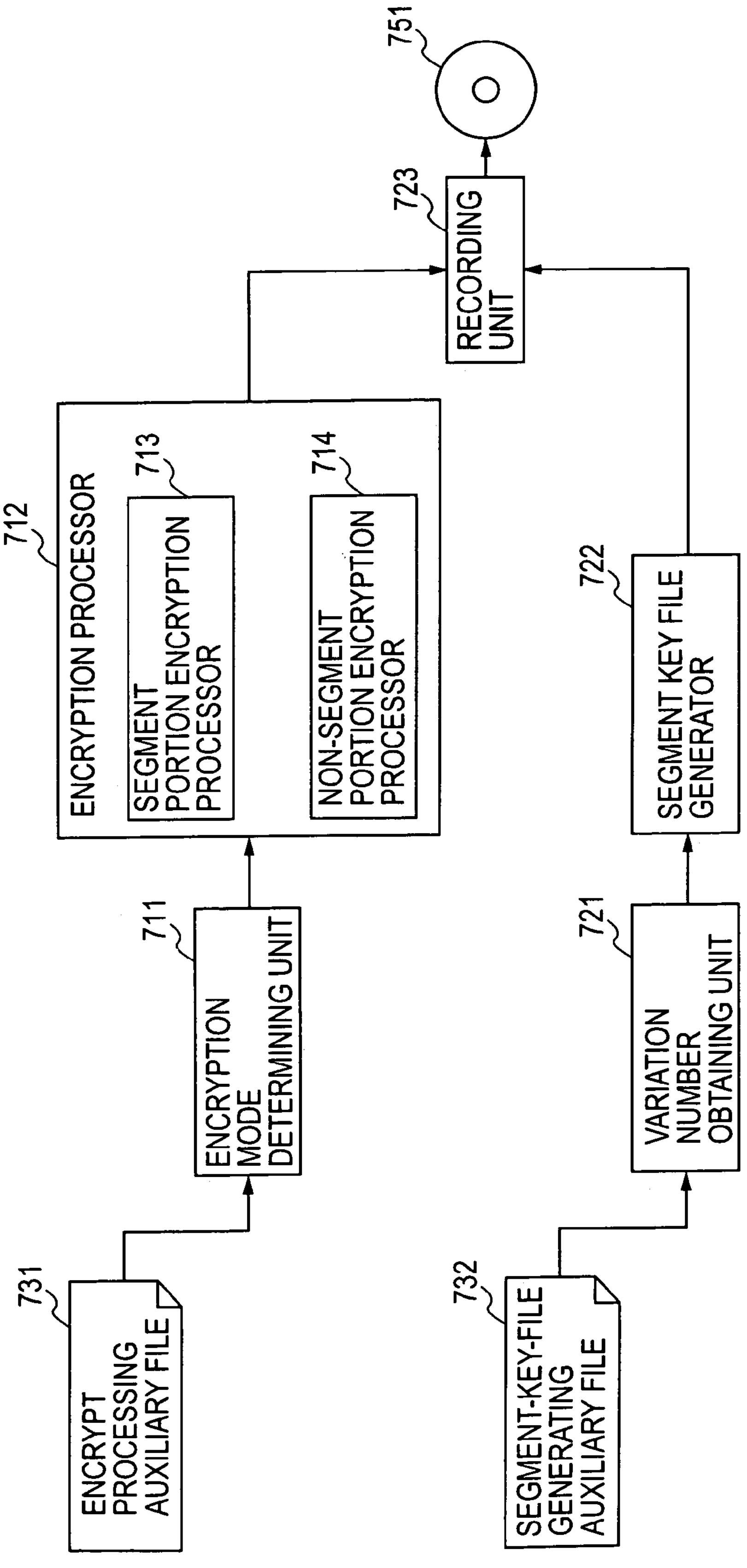
FIG. 26 illustrates the configuration of an information processing apparatus that generates data to be recorded on an information recording medium.

FIG. 26 is a block diagram illustrating the functional configuration of an information processing apparatus or an information recording medium manufacturing apparatus, which serves as an apparatus for recording data on an information recording medium. An encryption mode determining unit 711 determines the encryption mode for each sector, which is an encrypt processing unit, of content to be recorded on an information recording medium 751.

In determining the encryption mode, the encryption mode determining unit 711 refers to an encrypt processing auxiliary file 731 discussed with reference to FIGS. 21 and 22. More specifically, cryptographic key specifying processing for specifying a cryptographic key for each sector is performed based on the encrypt processing auxiliary file 731. The encrypt processing auxiliary file 731 includes determination information indicating whether each sector, which is an encrypt processing unit, is segment data or non-segment data, and identification information for identifying the segment and the variation associated with the sector if the sector is segment data.

An encryption processor 712 includes a segment portion encryption processor 713 for generating encrypted data having different variations by using a plurality of cryptographic keys for segment portions of content and a non-segment portion encryption processor 714 for generating encrypted data by using the unit key for non-segment portions, which are different from segment portions. Each encryption processor 713 or 714 performs encrypt processing by using the cryptographic key determined in the encryption mode determining unit 711, i.e., the segment key or the unit key. A recording unit 723 records the encrypted content generated in the encryption processor 712 on the information recording medium 751.

The encryption mode determining unit 711 reads the encryption flag associated with the subject sector from the encrypt processing auxiliary file 731 to determine whether encryption is necessary. If encryption is necessary, the encryption mode determining unit 711 refers to the encrypt processing auxiliary file 731 to determine whether the subject sector is segment data or non-segment data. If the subject sector is found to be segment data, the encryption mode determining unit 711 obtains the segment number and the variation number associated with the subject sector from the encrypt processing auxiliary file 731, and selects the segment key, which is to be used as the cryptographic key, in accordance with the variation on the basis of the obtained segment and variation numbers. The segment portion encryption processor 713 performs encrypt processing on the segment data by using the segment key in accordance with the variation selected by the encryption mode determining unit 711, thereby generating encrypted data having different variations.

If the subject sector is found to be non-segment data based on the encrypt processing auxiliary file 731, the encryption mode determining unit 711 selects the unit key, which is to be used as the cryptographic key, based on the unit identifier recorded in the auxiliary file, and the non-segment portion encryption processor 714 executes encrypt processing on the non-segment portion by using the unit key selected by the encryption mode determining unit 711, thereby generating encrypted data.

In the encrypt processing auxiliary file 731, concerning content that does not use segment keys, identification information FFFF is set in the segment number and the variation number to indicate that the content is segment-key-nonuse content. The encryption mode determining unit 711 stops obtaining segment keys when receiving identification information indicating that the content is segment-key-nonuse content based on the encrypt processing auxiliary file 731.

A variation number obtaining unit 721 sequentially obtains variation numbers by using a segment-key-file generating auxiliary file 732 discussed with reference to FIGS. 24A and 24B. That is, as stated with reference to FIGS. 24A and 24B, by using the segment-key-file generating auxiliary file 732, the variation number obtaining unit 721 sequentially obtains the variation numbers set in accordance with combinations (j, k) of the path numbers (j), which are information for specifying key strings used for encrypting content to be recorded on an information recording medium, and the segment numbers (k), which are identification information for identifying segments of the content.

Based on the variation numbers obtained by using the segment-key-file generating auxiliary file 732, a segment key file generator 722 sequentially obtains information for generating segment keys to be used for encrypt processing on the data associated with the individual segments and the individual variations and stores the information in a file, thereby generating a segment key file. The recording unit 723 records the segment key file generated in the segment key file generator 722 on the information recording medium 751.

In addition to the information described above, other types of information, such as the CPS unit key file and the MKB, are recorded by the recording unit 723, though they are not shown in FIG. 26.

5. Example of Configuration of Information Processing Apparatus

Figure 27:
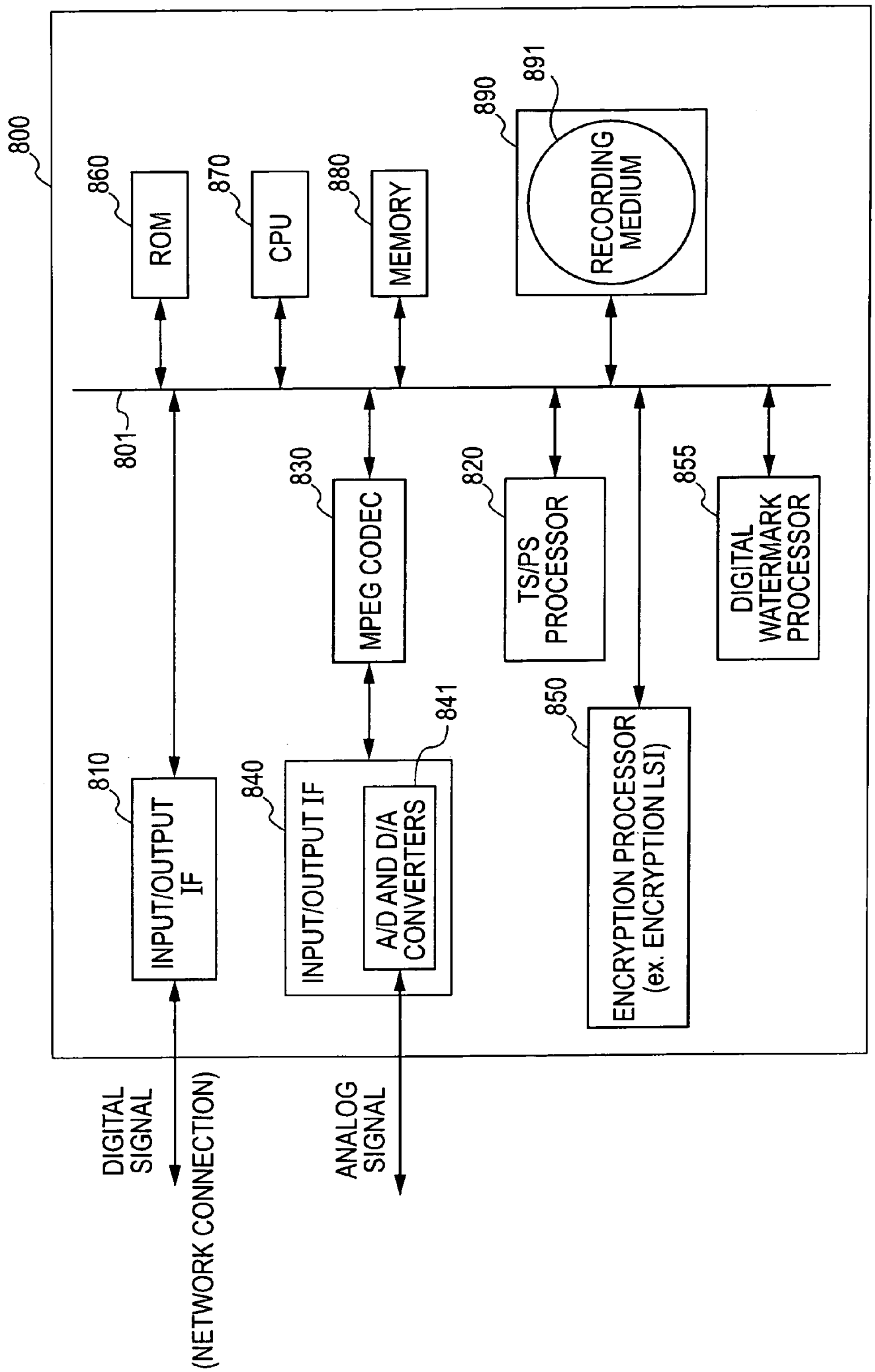
FIG. 27 illustrates an example of the configuration of an information processing apparatus that records or plays back information on or from an information recording medium.

An example of the hardware configuration of an information processing apparatus for the above-described content recording processing or playback processing is described below with reference to FIG. 27.

An information processing apparatus 800 includes a drive 890 for driving an information recording medium 891 and inputting and outputting a data recording/playback signal, a central processing unit (CPU) 870 for executing data processing according to various programs, a ROM 860, which serves as a storage area, for storing programs and parameters, a memory 880, an input/output interface (IF) 810 for inputting and outputting digital signals, an input/output interface (IF) 840 for inputting and outputting analog signals and including analog-to-digital (A/D) and digital-to-analog (D/A) converters 841, an MPEG codec 830 for encoding and decoding MPEG data, a TS/PS processor 820 for executing TS/PS processing, an encryption processor 850 for executing various encrypt processing operations, and a digital watermark processor 855. The above-described blocks are connected to a bus 801. The digital watermark processor 855 is necessary in an information processing apparatus when an authoring facility or a disc factory generates recording data, and is not necessary in an information processing apparatus that performs regular data playback processing.

The operation of the information processing apparatus 800 when recording data is as follows. Two cases can be considered where data to be recorded is a digital signal and an analog signal as an input.

If a digital signal is input, it is input from the digital signal input/output IF 810 and is converted into a storage data format by the CPU 870 and the TS/PS processor 820. Then, the storage data format is converted into, for example, an MPEG2 format, by the MPEG codec 830, and is encrypted by the encryption processor 850. The encrypt processing is executed by using the CPS unit key and segment keys, as discussed above, and is executed after generating required key data. The data encrypted by the encryption processor 850 is stored in the information recording medium 891.

If an analog signal is input, it is input from the input/output IF 840 and is converted into a digital signal by the A/D converter 841, and is further converted into a codec to be used when being recorded by the MPEG codec 830. Then, the codec is converted into AV multiplexed data, which is a recording data format, by the TS/PS processor 820 and is encrypted by the encryption processor 850. The encrypted data is then stored in the recording medium 891.

The processing for playing back data from the information recording medium 890 is now described below. It is now assumed, for example, that AV stream data formed of MPEG-TS data is played back. If data read from the information recording medium 891 by the drive 890 is identified as a content management unit, necessary key data is generated and the content management data is decrypted by using the generated keys in the encryption processor 850. That is, the unit key and segment keys associated with the content management unit are obtained, and based on the obtained unit key and segment keys, decrypt processing using the keys is executed in the encryption processor 850.

The decrypted content data is divided into individual data, such as video, audio, and subtitles, by the TS/PS processor 820. The digital data decrypted by the MPEG codec 830 is converted into an analog signal by the D/A converter 841 of the input/output IF 840 and is then output. If digital output is performed, MPEG-TS data is output as digital data via the input/output IF 810. In this case, the data is output to a digital interface, such as an IEEE1394 interface, an Ethernet cable, or a wireless local area network (LAN). If network connection is implemented, the input/output IF 810 has a network connection function. If the playback apparatus converts the data into a format that can be received by a receiving device, the MPEG codec 830 performs rate conversion and codec conversion on the video, audio, and subtitles divided by the TS/PS processor 820, and then, the TS/PS processor 820 multiplexes the divided data into a MPEG-TS or MPEG-PS and then outputs the multiplexed data from the digital input/output IF 810. Alternatively, the CPU 870 converts the data into a codec or a multiplexed file other than MPEG and outputs it from the digital input/output IF 810.

The program for executing the playback and recording processing is stored in the ROM 860, and while executing the program, the memory 880 is used as a storage area for parameter and data or as a work area if necessary. Although the information processing apparatus 800 shown in FIG. 27 is capable of performing both recording and playback processing, an apparatus having only a playback function or a recording function may be used.

The series of processing jobs described in the specification may be executed by hardware or software or a combination thereof. If software is used, a program recording a processing sequence therein can be installed into a memory of a computer built in dedicated hardware or a general-purpose computer that can execute various processing jobs.

The program may be prerecorded in a hard disk or a ROM as a recording medium. Alternatively, the program may be temporarily or permanently stored (recorded) in a removable recording medium, such as a flexible disk, a compact disc read only memory (CD-ROM), a magneto-optical (MO) disk, a DVD, a magnetic disk, or a semiconductor memory. Such a removable recording medium can be provided as so-called "package software".

The program may be installed into a computer from the above-described removable recording medium. Alternatively, the program may be wirelessly transferred from a download site into a computer or transferred into a computer by wired means via a network, such as a LAN or the Internet, and the computer can receive the transferred program and install it in a recording medium, such as a built-in hard disk.

The various processing jobs discussed in the specification may be executed in chronological order as described in the specification. Alternatively, the processing jobs may be executed in parallel or individually in accordance with the processing performance of an apparatus executing the processing jobs or according to the necessity. In this specification, the system is a logical set of a plurality of apparatuses, and it is not necessary that the apparatuses be in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording medium manufacturing method, comprising:

determining an encryption mode of each sector of a plurality of sectors, each sector serving as an encrypt processing unit for content to be recorded on an information recording medium, the determining step including determining whether each sector is a segment portion or a non-segment portion on the basis of an auxiliary file including determination information indicating whether each sector is data of the segment portion or data of the non-segment portion, each segment portion being defined as content encrypted based on a cryptographic key determined from a segment number and a variation number stored in the auxiliary file, and each non-segment portion being defined as content encrypted based on a unit identifier of the sector stored in the auxiliary file;

determining, for each sector determined to be the data of the non-segment portion, a corresponding unit cryptographic key, based on the unit identifier of the sector recorded in the auxiliary file, wherein the corresponding unit cryptographic key is different depending on the unit identifier recorded in the auxiliary file, each unit cryptographic key being stored in a corresponding unit key file;

generating first encrypted data using one of a plurality of predetermined cryptographic keys for each sector determined in the determining step to be the segment portion forming the content;

generating second encrypted data by using the corresponding unit cryptographic key for each sector determined in the determining step to be the non-segment portion, the non-segment portion being different from the segment portion; and recording the first encrypted data generated for each segment portion and the second encrypted data generated for each non-segment portion on the information recording medium, wherein, in determining the encryption mode, a cryptographic key for each sector is determined, and if the sector is determined to be the segment portion forming the content, the cryptographic key is determined based on the segment number and the variation number associated with the sector and stored in the auxiliary file, and if the sector is determined to be the non-segment portion, the determined corresponding unit cryptographic key is used for the sector, and in generating the first encrypted data for the segment portion and the second encrypted data for the non-segment portion, the encrypted data is generated by using the determined cryptographic key.

2. The information recording medium manufacturing method according to claim 1, wherein the encryption mode determining step includes:

reading sector data to be encrypted;

determining whether encryption is necessary based on an encryption flag of the sector to be encrypted, the encryption flag being read from the auxiliary file;

determining, if it is determined that encryption is necessary, whether the sector to be encrypted is data of the segment portion or data of the non-segment portion by referring to the auxiliary file; and obtaining, if it is determined that the sector to be encrypted is data of the segment portion, the segment number and the variation number associated with the sector to be encrypted from the auxiliary file, and selecting a segment key, which is used as a cryptographic key, corresponding to a variation on the basis of the obtained segment number and variation number, and in generating the encrypted data for the segment portion, the first encrypted data is generated by encrypting the segment portion forming the content by using the selected segment key.

3. An information processing apparatus, comprising:

encryption mode determining means for determining an encryption mode of each sector of a plurality of sectors, each sector serving as an encrypt processing unit for content to be recorded on an information recording medium, the encryption mode determining means determining whether each sector is a segment portion or a non-segment portion on the basis of an auxiliary file including determination information indicating whether each sector is data of the segment portion or data of the non-segment portion, each segment portion being defined as content encrypted based on a cryptographic key determined from a segment number and a variation number stored in the auxiliary file, and each non-segment portion being defined as content encrypted based on a unit identifier of the sector stored in the auxiliary file;

means for determining, for each sector determined to be the data of the non-segment portion, a corresponding unit cryptographic key, based on the unit identifier of the sector recorded in the auxiliary file, wherein the corresponding unit cryptographic key is different depending on the unit identifier recorded in the auxiliary file, each unit cryptographic key being stored in a corresponding unit key file;

segment portion encrypting means for generating first encrypted data using one of a plurality of predetermined cryptographic keys for each sector determined by the encryption mode determining means to be the segment portion forming the content;

non-segment portion encrypting means for generating second encrypted data by using the corresponding unit cryptographic key for each sector determined by the encryption mode determining means to be the non-segment portion, the non-segment portion being different from the segment portion; and recording means for recording the first encrypted data generated by the segment portion encrypting means and the second encrypted data generated by the non-segment portion encrypting means on the information recording medium, wherein the encryption mode determining means determines a cryptographic key for each sector, and if the sector is determined to be the segment portion forming the content, the cryptographic key is determined based on the segment number and the variation number associated with the sector and stored in the auxiliary file, and if the sector is determined to be the non-segment portion, the determined corresponding unit cryptographic key is used for the sector, and each of the segment portion encrypting means and the non-segment portion encrypting means generates the encrypted data by using the cryptographic key determined by the encryption mode determining means.

4. The information processing apparatus according to claim 3, wherein the encryption mode determining means reads an encryption flag of sector data to be encrypted from the auxiliary file to determine whether encryption is necessary, and determines, if it is determined that encryption is necessary, whether the sector to be encrypted is data of the segment portion or data of the non-segment portion by referring to the auxiliary file, and obtains, if it is determined that the sector to be encrypted is data of a segment portion, the segment number and the variation number associated with the sector to be encrypted from the auxiliary file and selects a segment key, which is used as a cryptographic key, corresponding to a variation on the basis of the obtained segment number and variation number, and the segment portion encrypting means generates the first encrypted data by encrypting the segment portion forming the content by using the segment key selected by the encryption mode determining means.

5. A non-transitory computer readable medium storing a computer program that causes a computer to execute an encryption method on content to be recorded on an information recording medium, the method comprising:

determining an encryption mode of each sector of a plurality of sectors, each sector serving as an encrypt processing unit, the determining step including determining whether each sector is a segment portion or a non-segment portion on the basis of an auxiliary file including determination information indicating whether each sector is data of the segment portion or data of the non-segment portion, each segment portion being defined as content encrypted based on a cryptographic key determined from a segment number and a variation number stored in the auxiliary file, and each non-segment portion being defined as content encrypted based on a unit identifier of the sector stored in the auxiliary file;

determining, for each sector determined to be the data of the non-segment portion, a corresponding unit cryptographic key, based on the unit identifier of the sector recorded in the auxiliary file, wherein the corresponding unit cryptographic key is different depending on the unit identifier recorded in the auxiliary file, each unit cryptographic key being stored in a corresponding unit key file;

generating first encrypted data using one of a plurality of predetermined cryptographic keys for each sector determined in the determining step to be the segment portion forming the content; and generating second encrypted data by using the corresponding unit cryptographic key for each sector determined in the determining step to be a non-segment portion, the non-segment portion being different from the segment portion, wherein, in determining the encryption mode, a cryptographic key for each sector is determined, and if the sector is determined to be the segment portion forming the content, the cryptographic key is determined based on the segment number and the variation number associated with the sector and stored in the auxiliary file, and if the sector is determined to be the non-segment portion, the determined corresponding unit cryptographic key is used for the sector.

6. An information processing apparatus, comprising:

an encryption mode determining unit configured to determine an encryption mode of each sector of a plurality of sectors, each sector serving as an encrypt processing unit for content to be recorded on an information recording medium, the encryption mode determining unit determining whether each sector is a segment portion or a non-segment portion on the basis of an auxiliary file including determination information indicating whether each sector is data of the segment portion or data of the non-segment portion, each segment portion being defined as content encrypted based on a cryptographic key determined from a segment number and a variation number stored in the auxiliary file, and each non-segment portion being defined as content encrypted based on a unit identifier of the sector stored in the auxiliary file;

a unit cryptographic key unit configured to determine, for each sector determined to be the data of the non-segment portion, a corresponding unit cryptographic key, based on the unit identifier of the sector recorded in the auxiliary file, wherein the corresponding unit cryptographic key is different depending on the unit identifier recorded in the auxiliary file, each unit cryptographic key being stored in a corresponding unit key file;

a segment portion encrypting unit configured to generate first encrypted data using one of a plurality of predetermined cryptographic keys for each sector determined by the encryption mode determining unit to be the segment portion forming the content;

a non-segment portion encrypting unit configured to generate second encrypted data by using the corresponding unit cryptographic key for each sector determined by the encryption mode determining unit to be the non-segment portion, the non-segment portion being different from the segment portion; and a recording unit configured to record the first encrypted data generated by the segment portion encrypting unit and the second encrypted data generated by the non-segment portion encrypting unit on the information recording medium, wherein the encryption mode determining unit determines a cryptographic key for each sector, and if the sector is determined to be the segment portion forming the content, the cryptographic key is determined based on the segment number and the variation number associated with the sector and stored in the auxiliary file, and if the sector is determined to be the non-segment portion, the determined corresponding unit cryptographic key is used for the sector, and each of the segment portion encrypting unit and the non-segment portion encrypting unit executes encrypt processing by using the cryptographic key determined by the encryption mode determining unit.

* * * * *